United States Patent [19]

Itoh

[11] Patent Number: 5,134,903
[45] Date of Patent: Aug. 4, 1992

[54] SHIFT CONTROL DEVICE OF TRANSMISSION

[75] Inventor: Masayoshi Itoh, Shizuoka, Japan

[73] Assignee: Suzuki Motor Corporation, Shizuoka, Japan

[21] Appl. No.: 720,742

[22] Filed: Jun. 25, 1991

[30] Foreign Application Priority Data

Jun. 30, 1990 [JP] Japan .................. 2-173494
Jun. 30, 1990 [JP] Japan .................. 2-173496

[51] Int. Cl.⁵ .............................................. B60K 41/06
[52] U.S. Cl. ........................................ 74/861; 74/878
[58] Field of Search ................ 74/861, 878, 335

[56] References Cited

U.S. PATENT DOCUMENTS

| | | | |
|---|---|---|---|
| 4,246,990 | 1/1981 | Strantz | 74/861 X |
| 4,583,171 | 4/1986 | Hara et al. | 74/861 X |
| 4,957,015 | 9/1990 | Ishikawa et al. | 74/335 |
| 5,074,168 | 12/1991 | Ishikawa et al. | 74/878 |

FOREIGN PATENT DOCUMENTS

| | | |
|---|---|---|
| 3931136 | 3/1990 | Fed. Rep. of Germany ........ 74/878 |
| 57-144338 | 9/1982 | Japan . |
| 57-144339 | 9/1982 | Japan . |
| 58-156754 | 9/1983 | Japan . |
| 60-159452 | 8/1985 | Japan . |
| 60-159453 | 8/1985 | Japan . |
| 62-196443 | 8/1987 | Japan . |
| 63-1840 | 1/1988 | Japan . |
| 1-98741 | 4/1989 | Japan .................. 74/878 |
| 2-80859 | 3/1990 | Japan .................. 74/878 |
| 2-80860 | 3/1990 | Japan .................. 74/878 |
| 2-89865 | 3/1990 | Japan .................. 74/878 |

Primary Examiner—Rodney H. Bonck
Assistant Examiner—Ryan W. Massey
Attorney, Agent, or Firm—Flynn, Thiel, Boutell & Tanis

[57] ABSTRACT

A shift control device includes a forward and reverse shifting mechanism for selectively drivingly connecting and disconnecting forward and reverse gear trains to and from a vehicle drive wheel. In shifting the transmission from reverse through neutral and into drive, the forward and reverse shift mechanism remains operatively engaged with the reverse gear train until the transmission is shifted from neutral into drive, at which time the forward and reverse shift mechanism moves into operative engagement with the forward gear train. In shifting from drive through neutral into reverse, the forward and reverse shift mechanism remains operatively engaged with the forward gear train until the transmission is shifted from neutral into reverse, at which time the forward and reverse shift mechanism is moved into operative engagement with the reverse gear train. Accordingly to another embodiment, if the forward and reverse shift mechanism becomes improperly engaged with one of the gear trains, this improper engagement is detected, and the forward and reverse shift mechanism is automatically adjusted by a slight amount to permit proper engagement with the gear train.

3 Claims, 15 Drawing Sheets

SHIFT CONTROL DEVICE OF TRANSMISSION

FIELD OF THE INVENTION

This invention relates to a shift control device of a transmission, and particularly to a shift control device of a transmission capable of providing an easy operation for overcoming trouble when the shifting operation of a forward and reverse shifting mechanism does not go well and also capable of reducing the generation of sound by the shifting operation of the forward and reverse shifting mechanism, especially when the temperature is low.

BACKGROUND OF THE INVENTION

Vehicles such as automobiles are provided with a transmission in order to properly take off driving force generated by an internal combustion engine while taking a running state of the vehicle into consideration. Among various transmissions, there are manually operated transmissions in which a driver manually converts and takes off driving force of an internal combustion engine in accordance with a required gear ratio and taking the running state of the vehicle into consideration, and automatic transmissions in which the driving force of an internal combustion engine is automatically converted and taken off in accordance with a required gear ratio and taking the vehicle running state into consideration.

Examples of such automatic transmissions are disclosed in Japanese Patent Early. Laid-open Publication Nos. Sho 63-1840 and Sho 62-196443.

A transmission disclosed in Japanese Patent Early Laid-open Publication No. Sho 63-1840 is of a type that driving force of an internal combustion engine is taken off through an electromagnetic clutch, a belt type non-stage transmission, and an auxiliary transmission having a forward gear, a reverse gear and a selector sleeve and which comprises a rotation control device for establishing a gear stage of the auxiliary transmission by rotating the selector sleeve relative to the forward gear or to the reverse gear, in the event the selector sleeve is not engaged with the forward gear or with the reverse gear when a shift mechanism is operated to a forwarding position or a reversing position.

A transmission disclosed in Japanese Patent Early Laid-open Publication No. Sho 62-196443 is of a type that driving force of an internal combustion engine is taken off through an automatic clutch, a stage transmission having a forward gear, a reverse gear and a selector sleeve, and a belt type non-stage transmission, and a predetermined amount of torque is transmitted for a short time through the automatic clutch, in the event the selector sleeve of the stage transmission is not engaged with the forward gear or with the reverse gear within a predetermined time after a shift mechanism is operated to a forwarding position or a reversing position.

One example of a shift control device of a transmission is shown in FIG. 14. In FIG. 14, the numeral 302 denotes a transmission. In this transmission 302, the gear ratio is, continuously and infinitesimally, varied by relatively increasing and decreasing the radius of rotation of a belt (not shown) looped around a primary sheave 304 and a secondary sheave 306 through oil pressure, and the driving force of an internal combustion engine is automatically converted and taken off in accordance with a required gear ratio and taking the running state of the vehicle into consideration.

This transmission 302 includes a hydraulic clutch 308 operated to be engaged and disengaged by oil pressure and a forward and reverse shifting mechanism 310 which can be shifted to a forward and reverse engagement state. The hydraulic clutch 308 is operated to be engaged and disengaged by oil pressure which is supplied to an oil pressure chamber not shown.

The forward and reverse shifting mechanism 310, as shown in FIG. 15, comprises a rotatable shaft 312, a forward shifting gear 316 forming a forward gear train 314, a reverse shifting gear 320 forming a reverse gear train 318, said gears 316 and 320 being rotatably supported on the rotatable shaft 312, and a selector sleeve 322 nonrotatably mounted on the rotatable shaft 312 and supported thereon for movement in the axial direction, the selector sleeve 322 selectively connecting either the forward shifting gear 316 or the reverse shifting gear 320 to the rotatable shaft 312 to attain a forward and reverse engagement state.

The transmission 302 is provided with an oil pump 324 for generating oil pressure for operating the primary sheave 304, secondary sheave 306, hydraulic clutch 308, and forward and reverse shifting mechanism 310. The oil pump 324 is connected at an intake side thereof with an oil pan (not shown) through a strainer 326 and connected at an outlet side thereof with a line pressure passage 328. The line pressure passage 328 is connected with a first line pressure control valve 330, a second line pressure control valve 332, a ratio control valve 334, a solenoid regulator valve 336, and a relief valve 338.

The solenoid regulator valve 336 is connected with the first line pressure control valve 330 and ratio control valve 334 through a line solenoid valve 340 and a resin solenoid valve 342, respectively. The second line pressure control valve 332 is connected with a lubrication system for lubricating a belt (not shown) and with an intake side of the oil pump through a loop regulator valve 344. This loop regulator valve 344 is connected with a cooling control valve 346. The cooling control valve 346 is connected with an oil cooler 348 and the hydraulic clutch 308.

Also, the line pressure passage 328 is connected with a clutch control valve 350 for regulating clutch pressure as oil pressure which is to be supplied to the hydraulic clutch 308. The clutch control valve 350 is connected with the solenoid regulator valve 336 through a clutch solenoid valve 352. The oil pressure regulated by the clutch control valve 350 is supplied to and exhausted from a manual shift valve 354 through a shift servo valve 356.

The manual shift valve 354 is connected with the line pressure passage 328. The manual shift valve 354 comprises a valve body 358, a manual shift rod 362 slidably disposed within a slide hole 360 of the valve body 358, and a spool valve element 364 integral with the manual shift rod 362.

The shift servo valve 356 comprises a valve body 366, a piston 370 slidably disposed within a cylinder 368 of the valve body 366, a first chamber 372 and a second chamber 374 being defined within the cylinder 364 by the piston 370, a shift side rod 376 connected to one end of the piston 370, a spool valve element 378 disposed at an intermediate portion of the shift side rod 376, and a shift fork 380 fixed to the rod 376 on a side of valve element 378 opposite piston 370. The shift fork 380 is engagable with the selector sleeve 322 of the forward and reverse shifting mechanism 310.

The manual shift valve 354 is shifted by an operating rod 384 (FIG. 15) of a shift mechanism 382, thereby supplying and exhausting oil pressure from the clutch control valve 350 and line pressure passage 328 to and from the shift servo valve 356. The shift servo valve 356 is shifted by supplying and exhausting oil pressure from the line pressure passage 328 through the manual shift valve 354 to and from the first and second chambers 372 and 374, thereby supplying and exhausting oil pressure to and from the hydraulic clutch 308 and shifting the forward and reverse shifting mechanism 310.

Therefore, in the shift servo valve 356, oil pressure is normally supplied either to the first chamber 372 or to the second chamber 374 and force for pushing the rod 376 either in direction A or in direction B is normally produced as shown in FIGS. 16 through 20.

The shift mechanism 382 has various operating positions such as, for example, a parking position P, a reversing position R, a neutral position N, a forwarding position D, and a low speed running position L. In the respective operating positions P, R, N, D and L of the shift mechanism 382, the manual shift valve 354 and the shift servo valve 356 are shifted as shown in FIGS. 16 through 20, respectively.

At this time, in the respective operating positions P, R, N, D and L of the shift mechanism 382, the forward and reverse shifting mechanism 310 is brought into the following engagement states such as, for example, a forward engagement state FWD and a reverse engagement state REV. That is, in the parking position P and in the reversing position R, force for pushing the shift servo rod 376 in the direction B is produced because oil pressure is supplied into the second chamber 374 of the shift servo valve 356, and shifting mechanism 310 is held in the reverse engagement state REV. In the neutral position N, forwarding position D and low-speed running position L, a force is produced for pushing the shift servo rod 376 in the direction A because oil pressure is supplied into the first chamber 372 of the shift servo valve 356, and shifting mechanism 310 is brought into the forward engagement state FWD. This operation is summarized as follows:

| Operating Position | Engagement State |
| --- | --- |
| P | REV |
| R | REV |
| N | FWD |
| D | FWD |
| L | FWD |

That is, shifting operation between the forward engagement state FWD and reverse engagement state REV of the forward and reverse shifting mechanism 310 is performed between the reversing position R and the neutral position N of the shift mechanism 382. Otherwise, shifting operation between the forward engagement state FWD and the reverse engagement state REV of the forward and reverse shifting mechanism 310 is sometimes performed between the neutral position N and the forwarding position D of the shift mechanism 382.

Accordingly, shifting operation between the forward engagement state FWD and the reverse engagement state REV of the forward and reverse shifting mechanism 310 is performed between one particular operating position of the shift mechanism 382 and another operating position adjacent to this one operating position.

However, in such conventional shift control devices, since shifting operation between the forward engagement state FWD and the reverse engagement state REV of the forward and reverse shifting mechanism 310 is performed between one particular operating position of the shift mechanism and another operating position adjacent to this one operation position as mentioned above, there is a problem in that, when shifting operation of the forward and reverse shifting mechanism 310 does not go well, operation of the shift mechanism 382 for overcoming this unfavorable condition of shifting operation is difficult to perform.

For example, in a shift control device of a transmission in which shifting operation between the forward engagement state FWD and the reverse engagement state REV of the forward and reverse shifting mechanism 310 is performed between the reversing position R and the neutral position N of the shift mechanism 382, when the shift mechanism 382 is operated from the reversing position R to the forwarding position D via the neutral position N, the forward and reverse shifting mechanism 310 is initially in the reverse engagement state REV (FIG. 17), and when the shift mechanism 382 is operated to the neutral position N, it is shifted to the forward engagement state FWD (FIG. 18).

At this time, when shifting operation of the forward and reverse shifting mechanism 310 does not go well, it becomes impossible for the vehicle to run even if the shift mechanism 382 is operated to the forwarding position D because driving force cannot be transmitted to the wheels.

In such instance, a driver usually tries to overcome the unfavorable condition of the forward and reverse shifting mechanism 310 by operating the shift mechanism 382 again to the forwarding position D after it is once operated to the neutral position N. However, since the engagement state of the forward and reverse shifting mechanism 310 is the forward engagement state FWD both in the neutral position N and forwarding position D, oil pressure to be supplied to and exhausted from the first and second chambers 372 and 374 of the shift servo valve 356 pushes the piston 370 in the direction A in order to bring the forward and reverse shifting mechanism 310 into the forward engagement state FWD. As a consequence, the unfavorable condition of shifting operation of the forward and reverse shifting mechanism 310 is impossible to overcome. In order to overcome the unfavorable condition of shifting operation, it is necessary to operate the shift mechanism 382 again to the forwarding position D via the neutral position N after it is once operated to the reversing position R.

However, there is an inconvenience in that the driver has a psychological resistance to operating the shift mechanism 382 again to the forwarding position D via the neutral position N after it is once operated to the reversing position R when shifting operation of the forward and reverse shifting mechanism 310 does not go well. Thus, the operation for overcoming the unfavorable condition of shifting operation is difficult to perform with ease.

That is, the driver usually considers that the shifting operation trouble is due to the operation for shifting the shift mechanism 382 from the neutral position N to the forwarding position D in the event shifting operation of the forward and reverse shifting mechanism 310 does not go well when the shift mechanism 382 is operated from the neutral position N to the forwarding position D, and therefore, the idea of operating the shift mechanism 382 to the reversing position R usually does not occur to the driver.

As a consequence, there is an inconvenience since the driver has a psychological resistance to operating the shift mechanism 382 once to the reversing position R, and the operation required for overcoming the unfavorable condition of shifting operation is difficult to perform with ease.

Furthermore, there is a significant problem in the conventional shift control device of a transmission in that, where the shift mechanism 382 is operated between the neutral position N and the reversing position R particularly in a low temperature state of oil pressure, a larger sound of shifting operation of the forward and reverse shifting mechanism 310 is generated at the time shifting operation is made from the reversing position R to the neutral position N than at the time the shifting operation is made from the neutral position N to the reversing position R.

When the shift mechanism 382 is operated from the reversing position R to the neutral position N, the manual shift valve 354 is shifted to supply line pressure as oil pressure to the first chamber 372 of the shift servo valve 356 to exhaust line pressure in the second chamber 374, thereby moving the piston 370 in the direction A in FIGS. 17 and 18. At this time, in the reversing position R, the hydraulic clutch 308 is, as shown in FIG. 17, supplied with clutch pressure as oil pressure from the manual shift valve 354 through the shift servo valve 356 and engaged. Similarly, in the reversing position R, the forward and reverse shifting mechanism 310 is in the reverse engagement state REV.

When the shift mechanism 382 is operated to the neutral position N, the hydraulic clutch 308 is disengaged because, as shown in FIG. 18, clutch pressure as oil pressure is exhausted from the clutch through the shift servo valve 356 and the manual shift valve 354.

Furthermore, in shifting from reverse R to the neutral position N, the forward and reverse shifting mechanism 310 is shifted from the reverse engagement state REV to the forward engagement state FWD. In this way, when the shift mechanism 382 is operated from the reversing position R to the neutral position N, clutch pressure as oil pressure is exhausted from the hydraulic clutch 308 and the forward and reverse shifting mechanism 310 is shifted from the reverse engagement state REV to the forward engagement state FWD.

However, since the shifting operation of the shift servo valve 356 is faster than the exhaust of clutch pressure from the hydraulic clutch 308 and the shifting operation of the shift servo valve 356 becomes faster than the exhaust of clutch pressure from the hydraulic clutch 308 because viscosity of oil pressure is increased particularly at a low oil temperature, shifting operation of the forward and reverse shifting mechanism 310 to the forward engagement state FWD is performed before clutch pressure is completely exhausted from the hydraulic clutch 308, that is, before the hydraulic clutch 308 is fully disengaged. This becomes a cause for generating a sound of shifting operation caused by engagement of the forwarding gear train 314.

Where the shift mechanism 382 is shifted from the neutral position N to the reversing position R, clutch pressure as oil pressure is already completely exhausted from the hydraulic clutch 308 in the neutral position N and when the shift mechanism 382 is operated to the reversing position R, clutch pressure as oil pressure is supplied to the hydraulic clutch 308 and the forward and reverse shifting mechanism 310 is shifted from the forward engagement state FWD to the reverse engagement state REV. At this time, the shifting operation of the forward and reverse shifting mechanism 310 from the forward engagement state FWD to the reverse engagement state REV is completed before clutch pressure is supplied to the hydraulic clutch 308, that is, the hydraulic clutch is not yet fully engaged because shifting operation of the shift servo valve 356 is faster than the supply of clutch pressure to the hydraulic clutch 308. Thus, a sound of shifting operation caused by engagement of the reverse gear train 318 is not generated.

It is therefore an object of the present invention to provide a shift control device of a transmission capable of providing an easy operation for overcoming trouble when the shifting operation of the forward and reverse shifting mechanism does not go well and also capable of reducing the generation of a sound of shifting operation of the forward and reverse shifting mechanism, especially when the temperature is low.

In attempting to achieve the above-mentioned object, the present invention is designed such that in a shift control device of a transmission comprising a manual shift valve shifted by a shift mechanism of a transmission having a hydraulic clutch operated to be connected and disconnected by oil pressure and a forward and reverse shifting mechanism shiftable to forward and reverse engagement states and adapted to supply and exhaust oil pressure, and a shift servo valve shifted by oil pressure supplied and exhausted by the manual shift valve. The shift control device is characterized in that it further comprises an oil pressure supply and exhaust mechanism operated to shift the shift servo valve by supplying and exhausting oil pressure to and from the shift servo valve, so that when the shift mechanism is operated from a reversing position to a forwarding position via a neutral position, the shift servo valve is operated to hold the forward and reverse shifting mechanism in the reverse engagement state until the shift mechanism is operated to the neutral position and to shift the forward and reverse shifting mechanism to the forward engagement state when the shift mechanism is operated to the forwarding position, and when the shift mechanism is operated from the forwarding position to the reversing position via the neutral position, the shift servo valve is operated to hold the forward and reverse shifting mechanism in the forward engagement state until the shift mechanism is operated to the neutral position and to shift the forward and reverse shifting mechanism to the reverse engagement state when the shift mechanism is operated to the reversing position.

According to the construction of the present invention, the oil pressure supply and exhaust mechanism is operated to shift the shift servo valve by supplying and exhausting oil pressure to and from the shift servo valve, so that when the shift mechanism is operated from a reversing position to a forwarding position via a neutral position, or when the shift mechanism is operated from a forwarding position to a reversing position via a neutral position, the forward and reverse shifting mechanism is held in a reverse engagement state in a reversing position or in a forward engagement state in a forwarding position which is one position before the shift mechanism is shifted to the neutral position, and when the shift mechanism is operated from the neutral position to the forwarding position or to the reversing position, the forward and reverse shifting mechanism is shifted to the forward engagement state or to the reverse engagement state.

By this, since pressure oil of the shift servo valve is once exhausted in the neutral position and pressure oil is newly supplied to the shift servo valve when the shift mechanism is operated again to the forwarding position or reversing position by operating the shift mechanism again to the forwarding position or to the reversing position after the shift mechanism is once operated to the neutral position when shifting operation of the forward and reverse shifting mechanism does not go well, a reliable shifting operation can be obtained.

Similarly, when the shift mechanism is operated from the neutral position to the forwarding position or to the reversing position, the forward and reverse shifting mechanism is shifted to the forward engagement state or to the reverse engagement state. As a consequence, shifting operation of the forward and reverse shifting mechanism can be performed in a state where the hydraulic clutch, disengaged in the neutral position, is engaged by means of operation of the shift mechanism to the forwarding position or to the reversing operation, in other words, in a state where the hydraulic clutch is not fully engaged.

Referring to Japanese Patent Early Laid-open Publication No. Sho 62-196443, a shift control method of a transmission for the use of a vehicle disclosed in this publication is designed such that when a sleeve of a synchromesh device is not brought to a position indicating establishment of a gear stage of a stage transmission within a predetermined time after a shift lever is operated from a non-running state to a running state, a predetermined amount of torque is transmitted in a short time through an automatic clutch to exert relative force of rotation between a synchronous ring of the synchromesh device and output gear of the stage transmission, thereby making it possible to effect relative rotation of the synchronous ring and output gear which were unable to effect relative rotation and overcoming unableness of shift of the gear stage caused by unfavorable relative rotation.

Referring to Japanese Patent Early Laid-open Publication No. Sho 63-1840, a transmission for the use of a vehicle equipped with a secondary transmission disclosed in this publication is designed such that in the event a sleeve is not brought to a first or second position notwithstanding that a shift operating lever is shifted to a forward or reverse range when a vehicle stops, rotation of a rotatable member is permitted by a predetermined amount in order to rotate a forward or reverse gear by a predetermined amount relative to the sleeve, so that interference between the sleeve and the forward or reverse gear is promptly removed, generation of gear meshing sound is restrained, and the gear stage of the secondary transmission is more reliably established.

Furthermore, regarding the shift mechanism of a non-stage transmission, almost all of Japanese Patent Early Laid-open Publication Nos Sho 57-144338, Sho 57-144339, Sho 58-156754, Sho 60-159452, and Sho 60-159453 employ a mechanical type shift mechanism. This mechanical type shift mechanism is widely used. However, if a hydraulic type shift mechanism is used, there can be obtained an advantage in that shift operation can be smoothly performed when compared with the mechanical type shift mechanism. Therefore, the hydraulic shift mechanism is being widely used in recent time.

Furthermore, as is shown in FIG. 34, clutch pressure and line pressure are respectively supplied to the manual shift valve 472 of a hydraulic control circuit 404 of a hydraulic type shift mechanism, and clutch pressure and line pressure are also respectively supplied to the shift servo valve 480.

In one type of conventional shift control device of a transmission, a forward and reverse shifting mechanism for shifting, for example, a forward and reverse engagement state of a transmission, is mechanically shifted by a shift mechanism. In the case of such mechanical type shift mechanism, a smooth shifting operation is unobtainable.

In view of the foregoing, there is another type in which a manual shift valve is shifted by a shift mechanism in order to supply and exhaust oil pressure to and from a shift servo valve. A forward and reverse shifting mechanism for shifting, for example, a forward and reverse engagement state of a transmission, is shifted by this shift servo valve. According to such hydraulic type shift mechanism, shifting operation can be smoothly performed.

However, in the hydraulic servo type shift mechanism, there sometimes occurs a stop phenomenon indicating unfavorable engagement, in which chamfer parts where a gear and a sleeve are meshed are abutted at generally tops thereof with respect to each other when shifting operation is performed.

A similar stop phenomenon also occurs in the mechanical type shift mechanism. However, in the mechanical type shift mechanism, since a select lever is directly connected in motion with a shift part, the select lever is not operated until it is brought to an indicated position when a stop phenomenon indicating an unfavorable engagement occurs. Therefore, since the unfavorable engagement state can be confirmed, the shifting operation is newly performed again by operating the select lever again.

However, the hydraulic type shift mechanism has an inconvenience in that the select lever is operated to an indicated position when a stop phenomenon caused by wrong shifting, i.e., unfavorable engagement, occurs, and driving force is not transmitted because of occurrence of the stop phenomenon notwithstanding that D range or R range is indicated, and as a result, a vehicle becomes unable to start running.

It can be considered that when a stop phenomenon occurs, either a gear or a sleeve is rotated to remove the stop phenomenon and to complete the shifting operation. However, if a clutch is connected in order to rotate a gear when a stop phenomenon occurs, a ratchet sound (for instance, scratching sound) is generated at the chamfer parts and at least either the gear or sleeve is damaged.

It is, therefore, another object of the present invention to provide a shift control device of a transmission able to overcome an unfavorable engagement between either a forward gear or reverse gear and a shift member and to perform a reliable shifting operation. The device includes a shift servo valve for making clutch pressure into servo cylinder pressure in order to shift a forward and reverse shifting mechanism for shifting a forward and reverse engagement state of the non-stage transmission so as to supply and exhaust oil pressure, and a confirmation switch disposed at one end portion of a shift servo rod of the shift servo valve and adapted to confirm the position of the shift servo valve. At least the servo cylinder pressure of the shift servo valve is lowered when an unfavorable engagement state between either the forward gear or reverse gear and the shift member of the forward and reverse shifting mechanism is confirmed by the confirmation switch, and then the servo cylinder pressure is raised again in order to overcome the unfavorable engagement state between either the forward gear or reverse gear and the shift member of the forward and reverse shifting mechanism.

To achieve the above object, the present invention is constituted such that in a transmission for taking off driving force of an internal combustion engine in accordance with a running state of a vehicle after it is converted into a required gear ratio and having a hydraulic clutch which is connected and disconnected by means of supply and exhaust of oil pressure in order to engage and disengage engine driving force, a shift control device of said transmission is characterized in that it includes a forward and reverse shifting mechanism for shifting a forward and reverse engagement state of said non-stage transmission by a forward gear, a reverse gear and a shift member between said forward and reverse gears, a shift servo valve for making clutch pressure into servo cylinder pressure in order to supply and exhaust oil pressure by shifting said forward and reverse shifting mechanism, and a confirmation switch disposed at one end portion of a shift servo rod of said shift servo valve and adapted to confirm the position of said shift servo valve. At least the servo cylinder pressure of said shift servo valve is lowered when an unfavorable engagement state between either said forward gear or reverse gear and said shift member of said forward and reverse shifting mechanism is confirmed by said confirmation switch, and then the servo cylinder pressure is raised again in order to overcome the unfavorable engagement state between either said forward gear or reverse gear and said shift member of said forward and reverse shifting mechanism.

By virtue of the foregoing construction, when engagement between either the forward gear or reverse gear and the shift member is unfavorable, the servo cylinder pressure is lowered and then the servo cylinder pressure is raised again to overcome the unfavorable engagement between either the forward gear or reverse gear and the shift member of the forward and reverse shifting mechanism, thereby ensuring a reliable shifting operation.

BRIEF DESCRIPTION OF THE DRAWINGS

The embodiment of the present invention will be described in detail with reference to the drawings, in which.

DETAILED DESCRIPTION

Figure 1:
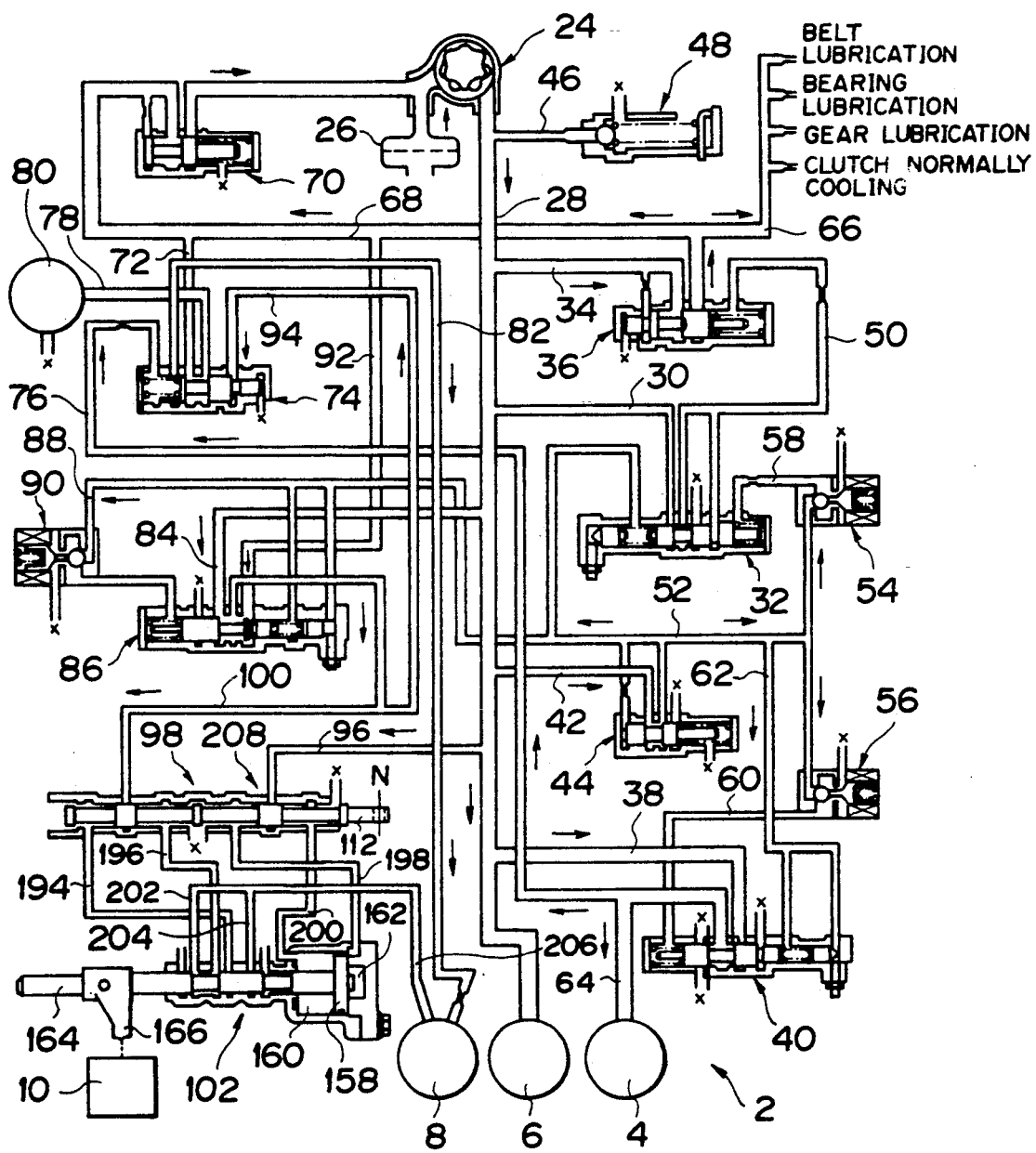
FIG. 1 is a circuit diagram of a shift control device of a transmission according to the invention.

FIGS. 1 through 13 show one embodiment of the present invention In FIG. 1, the numeral 2 is a transmission. In this transmission 2, the radius of rotation of a belt (not shown) looped around a primary sheave 4 and a secondary sheave 6 is relatively increased and decreased by oil pressure to vary the gear ratio continuously and infinitesimally, thereby automatically taking off driving force of an internal combustion engine in accordance with a required gear ratio and taking a running state of the vehicle into consideration.

Figure 2:
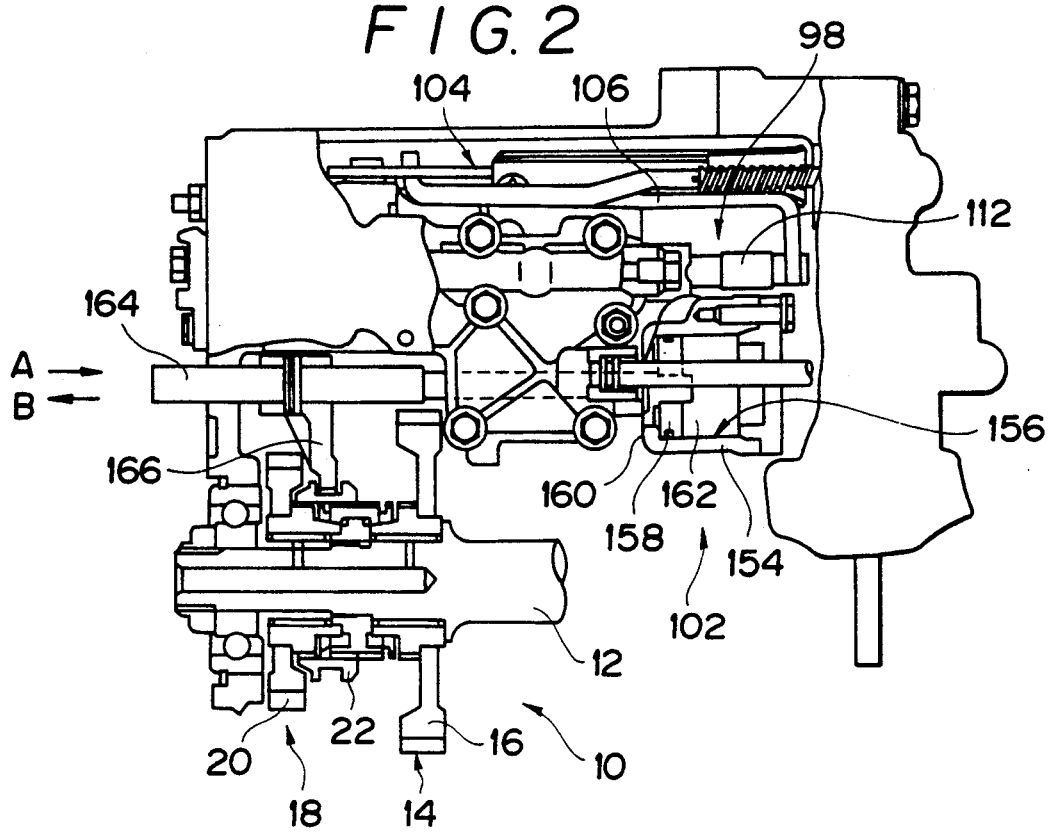
FIG. 2 is an explanatory view, partly in section, of the shift control mechanism according to the invention.

The transmission 2 includes a hydraulic clutch 8 operated to be engaged and disengaged by oil pressure, and a forward and reverse shifting mechanism 10 which is selectively shifted to forward and reverse engagement states. The hydraulic clutch 8 is operated to be engaged and disengaged by oil pressure which is supplied to an oil pressure chamber thereof (not shown). In the forward and reverse shifting mechanism 10, as shown in FIG. 2, a forward shifting gear 16 forming a forward gear train 14 and a reverse shifting gear 20 forming a reverse gear train 18 are rotatably supported on a rotatable shaft 12, and either the forward shifting gear 16 or the reverse shifting gear 20 is selectively connected to the rotatable shaft 12 by a selector sleeve 22 which is nonrotatably mounted on the rotatable shaft 12 and supported for movement in the axial direction, thereby attaining a forward and reverse engagement state.

The forward shifting gear 16 is meshed with a forward output gear (not shown) forming the forward gear train 14. Similarly, the reverse shifting gear 20 is meshed with a reverse output gear (not shown) through an idler gear, forming the reverse gear train 18.

The transmission 2 is provided, a shown in FIG. 1, with an oil pump 24 for generating oil pressure for operating the primary sheave 4, the secondary sheave 6, the hydraulic clutch 8 and the forward and reverse shifting mechanism 10. The oil pump 24 is connected at an intake side thereof with an oil pan (not shown) through a strainer 26, and at an outlet side thereof with a line pressure passage 28. The line pressure passage 28 is connected with the secondary sheave 6.

The line pressure passage 28 is connected at intermediate parts thereof with a first line pressure control valve 32 through a passage 30, with a second line pressure control valve 36 through a passage 34, with a ratio control valve 40 through a passage 38, with a solenoid regulator valve 44 through a passage 42, and with a relief valve 48 through a passage 46.

The first line pressure control valve 32 and the second line pressure control valve 36 are connected to each other through a passage 50. The solenoid regulator valve 44 is connected with a line solenoid valve 54 and a ratio solenoid valve 56 through a passage 52 which is bifurcated at the other end. The line solenoid valve 54 is connected with the first line pressure control valve 32 through a passage 58.

The ratio solenoid valve 56 is connected with the ratio control valve 40 through a passage 60. Also, this ratio control valve 40 is connected with solenoid regulator valve 44 by means of a passage 62 through the passage 52 and with the primary sheave 4 by means of a passage 64.

The second line pressure control valve 36 is connected with a lubrication system for lubricating a belt (not shown), etc. through a passage 66 and with an intake side of the oil pump 24 by means of a passage 68 through a loop regulator valve 70. The passage 68 is connected at an intermediate part thereof with a cooling control valve 74 through a passage 72. The cooling control valve 74 is connected with the passage 64 of the ratio control valve 40 through a passage 76, with an oil cooler 80 through a passage 78, and with the hydraulic clutch 8 through a passage 82.

Likewise, the line pressure passage 28 is connected an intermediate part thereof with a clutch control valve 86 through a passage 84. The clutch control valve 86 regulates oil pressure adapted to engage and disengage the hydraulic clutch 8. The clutch control valve 86 is connected with the first line pressure control valve 32 and the solenoid regulator valve 44 by means of a passage 88 through a clutch solenoid valve 90. Also, this clutch control valve 86 is connected with an intermediate part of the passage 68 through a passage 92 and with the cooling control valve 74 through a passage 94.

Furthermore, the line pressure passage 28 is connected at an intermediate part thereof with a manual shift valve 98 through a passage 96. The manual shift valve 98 is connected with the clutch control valve 86 by means of a passage 100 through the passage 94. This manual shift valve 98 is operated to supply and exhaust line pressure as oil pressure of the line pressure passage 28 to and from a shift servo valve 102 and to supply and exhaust clutch pressure as oil pressure coming from the clutch control valve 86 to and from the hydraulic clutch 8 through the shift servo valve 102.

Figure 3:
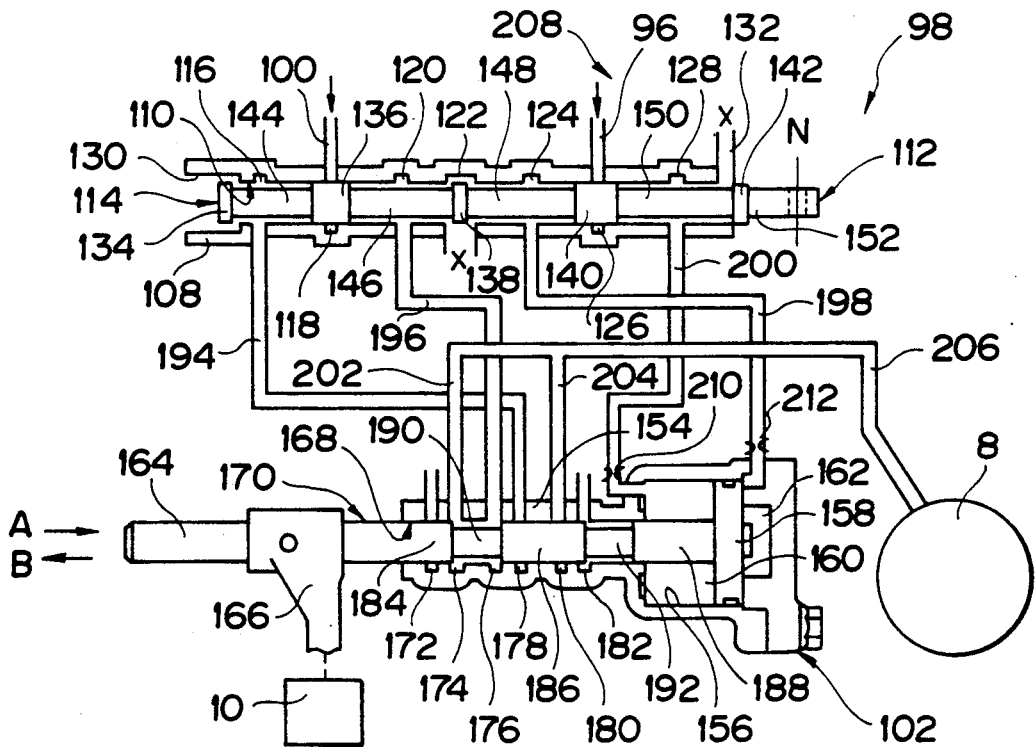
FIG. 3 is an explanatory view of the positions of a manual shift valve and a shift servo valve of FIG. 1 in a neutral shift position.

The manual shift valve 98 and the shift servo valve 102 are constructed as shown in FIG. 3.

The manual shift valve 98 is shifted by an operating rod 106 of a shift mechanism 104. This shift mechanism has various operating positions such as, for example, parking position P, reversing position R, neutral position N, forwarding (i.e. forward drive) position D and low-speed running position L. In these various operating positions P, R, N, D and L of the shift mechanism 104, the manual shift valve 98 is shifted to supply and exhaust oil pressure to and from the shift servo valve 102, and the forward and reverse shifting mechanism 10 is shifted to the forward engagement state FWD and reverse engagement state REV, respectively, as be described later.

The manual shift valve 98 includes a manual shift rod 112 slidably disposed in a slide hole 110 of a valve body 108, and a spool valve 114 integral with shift rod 112. The valve body 108 is provided with first to seventh annular groove portions 116 through 128 formed on an inner peripheral surface thereof and also with a first opening portion 130 and a second opening portion 132 at opposite ends of the slide hole 110.

The manual shift rod 112 is connected at one end thereof with the operating rod 106 of the shift mechanism 104. The spool valve 114 is provided with first to fifth large diameter portions 134 through 142 which slidably contact the inner peripheral surface of the slide hole 110, and is also provided with first to fourth small diameter portions 144 through 150 which are disposed between each adjacent pair of large diameter portions 134 through 142. The spool valve 114 is further provided with a fifth small diameter portion 152 disposed at one end thereof outside of the fifth large diameter portion 142.

In the shift servo valve 102, a piston 158 is slidably disposed within a cylinder 156 of a valve body 154, and the interior of the cylinder 156 is divided into a first chamber 160 and a second chamber 162 by the piston 158. The piston 158 is connected with one end of a shift servo rod 164, and a shift fork 166 which is to be engaged with the selector sleeve 22 of the forward and reverse shifting mechanism 10 is fixed to the shift servo rod 164 adjacent the other end thereof.

The shift servo rod 164 is slidably disposed within a slide hole 168 of the valve body 154 and is integral with a spool valve body 170. The valve body 154 is provided with first to sixth annular groove portions 172 through 182 formed in an inner peripheral surface thereof. The spool valve body 170 is provided with first to third large diameter portions 184 through 188 which slidably contact the inner peripheral surface of the slide hole 168, and is also provided with first and second small diameter portions 190 and 192 which are disposed between each adjacent pair of large diameter portions 184 through 188.

The first groove portion 116 in the valve body 108 of the manual shift valve 98 is connected with the fourth groove portion 178 in the valve body 154 of the shift servo valve 102 through a passage 194. The second groove portion 118 of the manual shift valve 98 is connected with the clutch control valve 86 by means of the passage 100 through the passage 94. The third groove portion 120 of the manual shift valve 98 is connected with the third groove portion 176 of the shift servo valve 102 through a passage 196. The fourth groove portion 122 of the manual shift valve 98 is connected with an oil pan (not shown).

The fifth groove portion 124 of the manual shift valve 98 is connected with the second chamber 162 of the shift servo valve 102 through a passage 198. The sixth groove portion 126 of the manual shift valve 98 is connected with the line pressure passage 28 through the passage 96. The seventh groove portion 128 of the manual shift valve 98 is connected with the first chamber 160 of the shift servo valve 102 through a passage 200. The first and second opening portions 130 and 132 of the manual shift valve 98 are connected with the oil pan.

Similarly, the first and sixth groove portions 172 and 182 of the shift servo valve 102 are connected with the oil pan. The second and fifth groove portions 174 and 180 of this shift servo valve 102 are connected with passages 202 and 204, respectively. These passages 202 and 204 converge and are connected with a passage 206, and the other end of the passage 206 is connected with the hydraulic oil chamber (not shown) of the hydraulic clutch 8.

By this, when the shift mechanism 104 is operated to various operating positions such as parking position P, reversing position R, neutral position N, forwarding position D and low-speed running position L, in these various operating positions P, R, N, D and L of the shift mechanism 104, the manual shift valve 98 is shifted to supply and exhaust clutch pressure and line pressure as oil pressure to and from the shift servo valve 102 so that oil pressure is supplied to and exhausted from the hydraulic clutch 8 by the shift servo valve 102 in order to connect and disconnect the hydraulic clutch 8 appropriately, and at the same time, the forward and reverse shifting mechanism 10 is shifted appropriately to the forward engagement state FWD or reverse engagement state REV.

That is, when the manual shift valve 98 is shifted by the shift mechanism 104, the engagement state between the valve body 108 and the spool valve body 114 is shifted, and line pressure and clutch pressure as pressure oil are supplied to and exhausted from the shift servo valve 102. Shift servo valve 102 is shifted because the shift servo rod 164 is moved in the directions shown by arrows A and B by line pressure supplied to and exhausted from the first and second chambers 160 and 162 which are defined by the piston 158.

By this, an engagement state between the valve body 154 of the shift servo valve 102 and the spool valve body 170 is shifted to supply and exhaust clutch pressure to and from the hydraulic clutch 8 so that the hydraulic clutch 8 is engaged and disengaged. In the shift servo valve 102, the forward and reverse shifting mechanism 10 is shifted to the forward engagement state FWD and reverse engagement state REV respectively by the shift fork 166 in accordance with movement of the shift servo rod 164 in the directions A and B.

The shift control device includes a pressure oil supply and exhaust mechanism 208 for supplying and exhausting pressure oil to and from the shift servo valve 102, so that in the event the shift mechanism 104 is operated to the forwarding position D from the reversing position R via the neutral position N, when the shift mechanism 104 is operated to the forwarding position D while holding the forward and reverse shifting mechanism 10 in the reverse engagement state REV until the shift mechanism 104 is operated to the neutral position N, the forward and reverse shifting mechanism 10 is shifted to the forward engagement state FWD, and in the event the shift mechanism 104 is operated to the reversing position R from the forwarding position D via the neutral position N, when the shift mechanism 104 is operated to the reversing position R while holding the forward and reverse shifting mechanism 10 in the forward engagement state FWD until the shift mechanism 104 is operated to the neutral position N, the forward and reverse shifting mechanism 10 is shifted to the reverse engagement state REV.

This oil pressure supply and exhaust mechanism 208 is part of the manual shift valve 98. The oil pressure supply and exhaust mechanism 208 comprises the groove portions 126 and 128 and the second opening portion 132 which are included in the valve body 108 of the manual shift valve 98, and the fourth and fifth large diameter portions 140 and 142 and the fourth small diameter portion 150 which are formed on the manual shift rod 112 of the manual shift valve 98.

Figure 6:
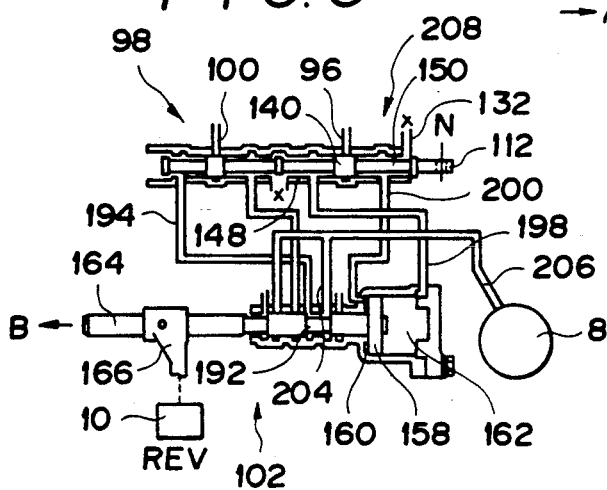
Figure 11:
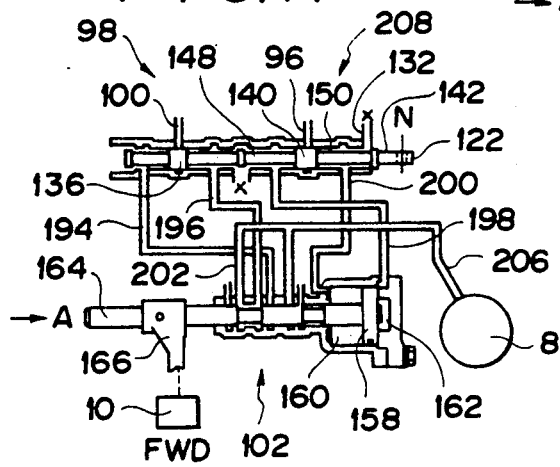

The aforementioned various component portions 126, 128, 132, 140, 142 and 150 of the oil pressure supply and exhaust mechanism 208 are, as shown in FIGS. 6 and 11, constructed such that when the shift mechanism 104 is operated from the reversing position R or from the forwarding position D to the neutral position N, the fourth large diameter portion 140 blocks off the passage 96 without allowing the passages 96 and 200 to communicate with each other, and the fourth small diameter portion 150 permits communication between the second opening portion 132 and the passage 200 because the fifth large diameter portion 142 does not block off the second opening portion 132.

When the shift mechanism 104 is operated to the neutral position N, the third small diameter portion 148 of the manual shift rod 112 permits communication between the passage 198 and the fourth groove portion 122.

That is, the oil pressure supply and exhaust mechanism 208 also prevents the piston 158 of the shift servo valve 102 from moving by allowing both the first and second chambers 160 and 162 of the shift servo valve 102 to communicate with the oil pan through the passage 200 and second opening portion 132, and through passage 198 and fourth groove portion 122, respectively.

Next, operation will be described.

First, details will be described in a case where the shift mechanism 104 is operated from the parking position P to the reversing position R, neutral position N, forwarding position D and the low-speed running position L in this order.

Figure 4:
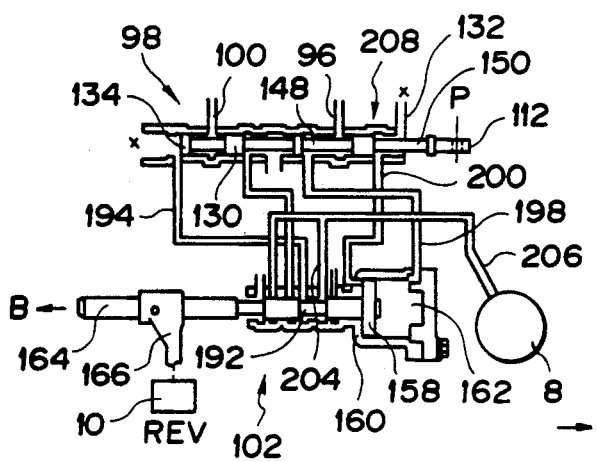
FIGS. 4 through 8 are explanatory views generally similar to FIG. 3, and illustrate the motions of the manual shift valve and shift servo valve in assuming various operating positions when the shift mechanism is operated from the reversing (R) position to the forwarding (D) position via the neutral (N) position.

When the shift mechanism 104 is operated to the parking position P, as shown in FIG. 4, the manual shift valve 98 allows the fourth small diameter portion 150 and second opening portion 132 to communicate the first chamber 160 of the shift servo valve 102 with the oil pan through the passage 200 and also allows the third small diameter portion 148 to communicate the second chamber 162 with the passage 96 through the passage 198. By this, in the shift servo valve 102, since line pressure of the first chamber 160 is exhausted and line pressure is supplied to the second chamber 162, the piston 158 moves the shift servo rod 164 in the direction B, and the forward and reverse shifting mechanism 10 is held in the reverse engagement state REV by the shift fork 166. At this time, since the manual shift valve 98 blocks off the passage 100 (see 134 and 136 in FIG. 4) and allows the passage 194, which is communicated with passage 206 by means of the shift servo valve 102 (see 192 in FIG. 4) and the passage 204, to communicate with the oil pan, it exhaust clutch pressure of the hydraulic clutch 8 so that the hydraulic clutch 8 is disengaged.

Figure 5:
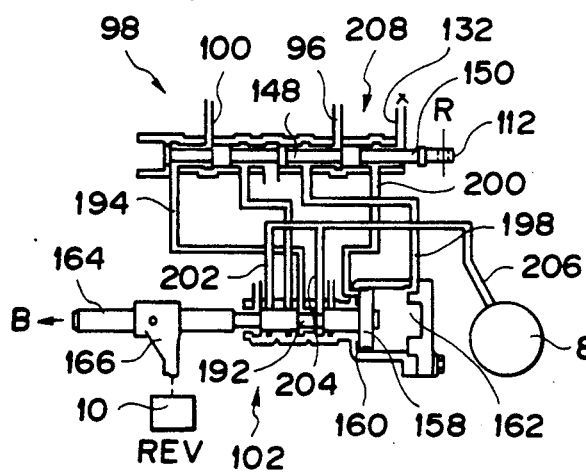

When the shift mechanism 104 is operated to the reversing position R, the manual shift valve 98, as shown in FIG. 5, allows the fourth small diameter portion 150 and second opening portion 132 to communicate the first chamber 160 of the shift servo valve 102 with the oil pan through the passage 200, and also allows the third small diameter portion 198 to communicate the second chamber 162 with the passage 96.

By this, in the shift servo valve 102, since line pressure is exhausted from the first chamber 160 and line pressure is supplied into the second chamber 162, the shift servo rod 164 is held in a state where it is moved in the direction B (i.e. the rod 164 is held in the same position as in FIG. 4) and the forward and reverse shifting mechanism 10 is held in the reverse engagement state REV. At this time, since the manual shift valve 98 allows the passage 100 to communicate with the passage 194 and also because the passage 194 communicates with the passage 206 through the passage 204 (see 192 in FIG. 5) by blocking off the passage 202 by means of the shift servo valve 102, clutch pressure is supplied to the hydraulic clutch 8 so that the hydraulic clutch 8 is engaged.

When the shift mechanism 104 is operated to the neutral position N, the manual shift valve 98, as shown in FIG. 6, allows the fourth small diameter portion 150 and second opening portion 132 to communicate the first chamber 160 of the shift servo valve 1 2 with the oil pan through the passage 200, blocks off the passage 96 by means of the fourth large diameter portion 140, and further allows the second chamber 162 to communicate with the oil pan through the passage 198 (see 148 in FIG. 6).

By this, in the shift servo valve 102, since line pressure of the first chamber 160 is exhausted and line pressure of the second chamber 162 is also exhausted, the piston 158 is prevented from moving. As a result, the shift servo rod 164 is held in a state where it is moved in the direction B (i.e. the rod 164 is held in the same position as in FIG. 5) and the forward and reverse shifting mechanism 10 is held in the reverse engagement state REV. At this time, since the manual shift valve 98 blocks off the passage 100 and allows the passage 194, which is communicated with the passage 206 by means of the shift servo valve 102 (see 192 in FIG. 6) through the passage 204, to communicate with the oil pan, clutch pressure of the hydraulic clutch 8 is exhausted so that the hydraulic clutch 8 is operated to be disengaged.

Figure 7:
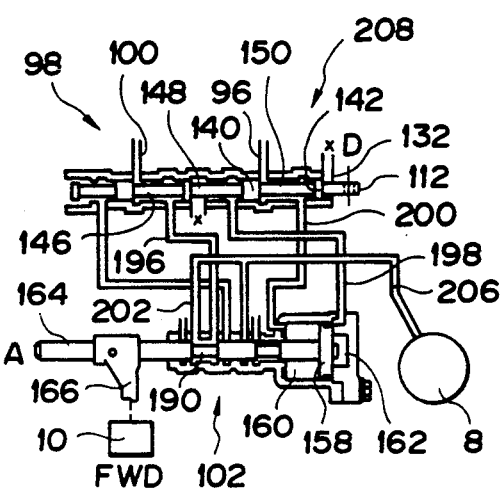

When the shift mechanism 104 is operated to the forwarding position D, the manual shift valve 98, as shown in FIG. 7, allows the fourth large diameter portion 140 to open the passage 96 and the fifth large diameter portion 142 to block off the second opening portion 132, allows the fourth small diameter portion 150 to communicate the first chamber 160 of the shift servo valve 102 with the passage 96 through the passage 200, and further allows the second chamber 162 to communicate with the oil pan through the passage 198 (see 148 in FIG. 7).

By this, in the shift servo valve 102, since line pressure is supplied into the first chamber 160 and line pressure of the second chamber 162 is exhausted, the piston 158 moves the shift servo rod 164 in the direction A and the forward and reverse shifting mechanism 10 is moved into the forward engagement state FWD. At this time, since the manual shift valve 98 allows passage 100 to communicate with the passage 196 (see 146 in FIG. 7) and because the passage 196 communicates with the passage 206 by means of the shift servo valve 102 (see 190 in FIG. 7) through the passage 202, clutch pressure is supplied to the hydraulic clutch 8 so that the hydraulic clutch 8 is operated to be engaged.

Figure 8:
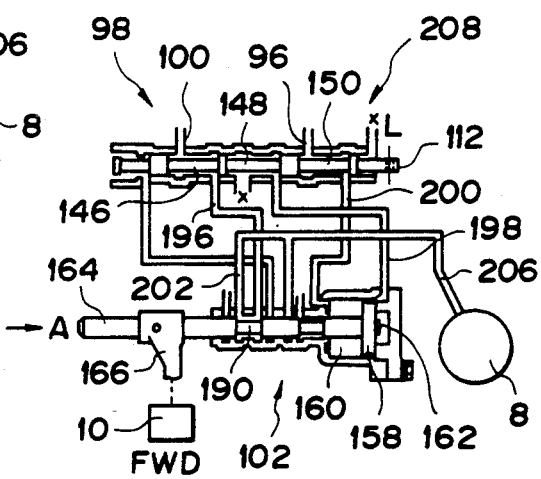

When the shift mechanism 104 is operated to the low-speed running position L, the manual shift valve 98, as shown in FIG. 8, allows the fourth small diameter portion 150 to communicate the first chamber 160 of the shift servo valve 102 with the passage 96 through the passage 200, and further allows the third small diameter portion 148 to communicate the second chamber 162 with the oil pan through the passage 198.

By this, in the shift servo valve 102, since line pressure is supplied into the first chamber 160 and line pressure of the second chamber 162 is exhausted, the shift servo rod 164 is held in a state where it is moved in the direction A (i.e. the rod 164 is held in the same position as in FIG. 7), and the forward and reverse shifting mechanism 10 is held in the forward engagement state FWD. At this time, since the manual shift valve 98 allows passage 100 to communicate with the passage 196 (see 146 in FIG. 8), and because the passage 196 communicates with the passage 206 by means of the shift servo valve 102 (see 190 in FIG. 8) through the passage 202, clutch pressure is supplied to the hydraulic clutch 8 so that the hydraulic clutch 8 is operated to be engaged.

In this way, when the shift mechanism 104 is operated from the parking position P to the reversing position R, neutral position N, forwarding position D and low-speed running position L in this order, the forward and reverse shifting mechanism 10 is brought into the following forward engagement state FWD or reverse engagement state REV in the various operating positions of the shift mechanism 104.

| Operating Position | Engagement Position |
| --- | --- |
| P | REV |
| R | REV |
| N | REV |
| D | FWD |
| L | FWD |

That is, the forward and reverse shifting mechanism 10 is shifted from the reverse engagement state REV to the forward engagement state FWD when the shift mechanism 104 is operated from the neutral position N to the forwarding position D.

Next, referring to FIGS. 9–13, details will be described in a case where the shift mechanism 104 is operated from the low-speed running position L to the forwarding position D, neutral position N, reversing position R and parking position P in this order.

Figure 13:
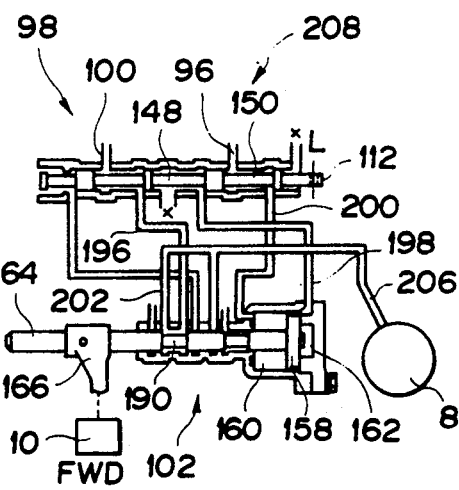
Figure 14:
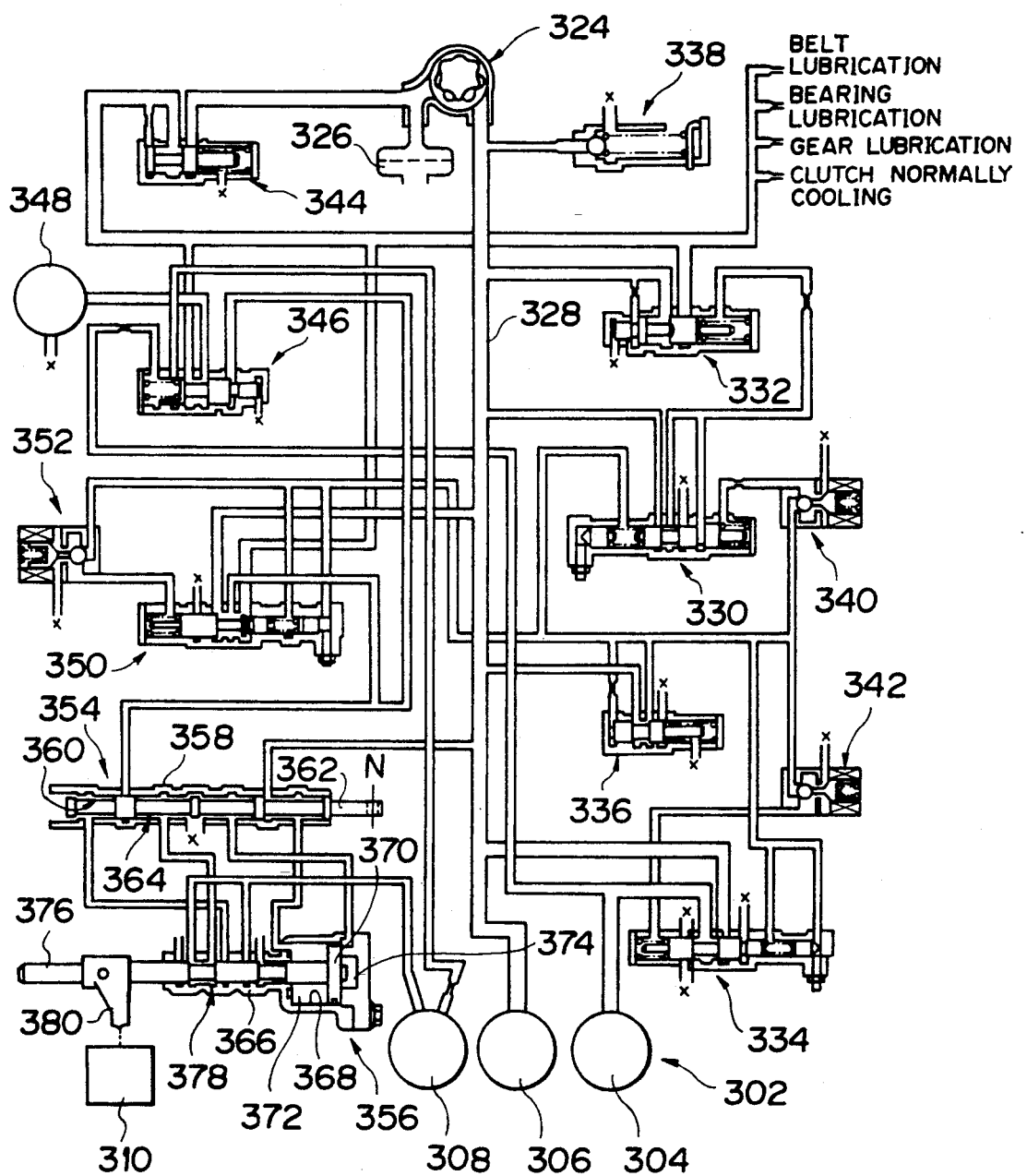
FIG. 14 is a circuit diagram of a conventional shift control device of a transmission.
Figure 15:
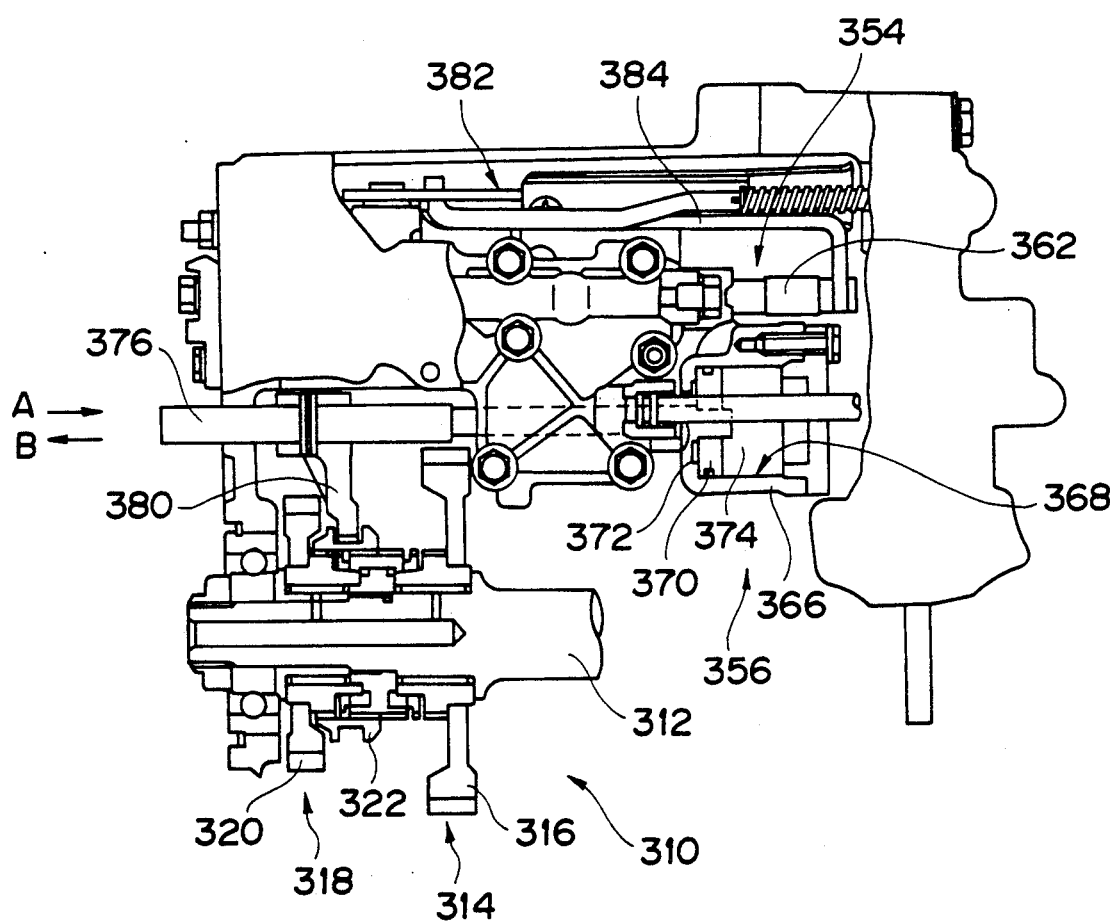
FIG. 15 is an explanatory view, partly in cross section, of a conventional shift control mechanism of a transmission.
Figure 16:
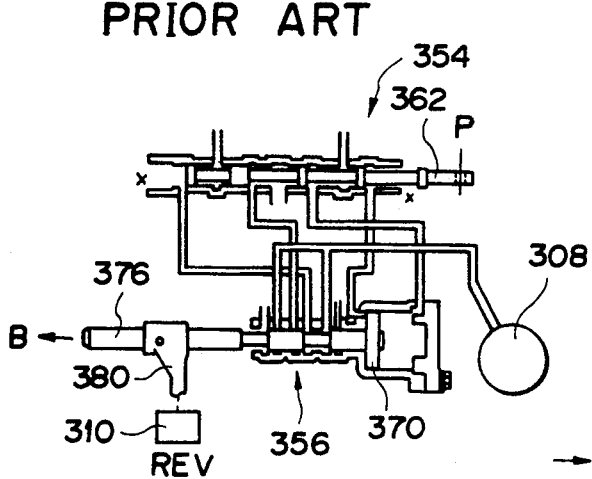
FIGS. 16 through 20 are explanatory views which illustrate the motions required for a manual shift valve and a shift servo valve to assume various operating positions when the conventional shift control mechanism is operated.
Figure 17:
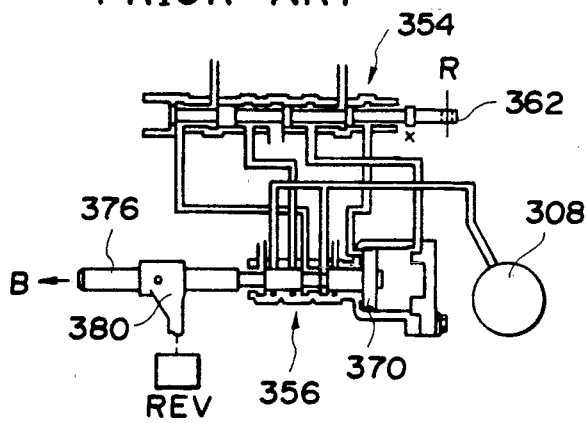
Figure 18:
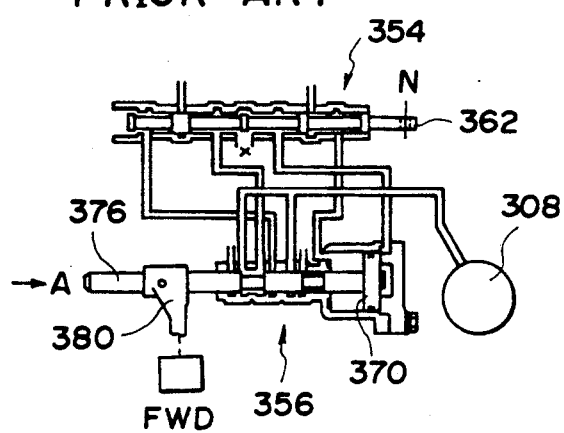
Figure 19:
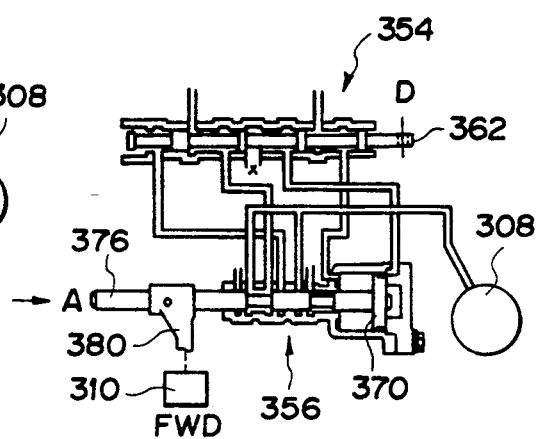
Figure 20:
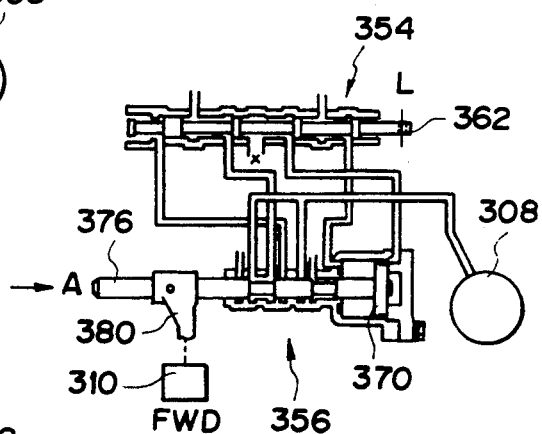

When the shift mechanism 104 is operated to the low-speed running position L, the shift servo rod 164 is held in the position which results when the shift servo rod 164 is moved by the piston 158 in the direction A, and the forward and reverse shifting mechanism 10 is held in the forward engagement state FWD because, as shown in FIG. 13, line pressure is supplied to the first chamber 160 of the shift servo valve 102 and line pressure is exhausted from the second chamber 162 as in FIG. 8. Furthermore, since the passage 100, which is communicated with the clutch control valve 86, is allowed to communicate with the passage 206 through the passages 196 and 202 (see 190 in FIG. 13), clutch pressure is supplied to the hydraulic clutch 8 so that the hydraulic clutch is engaged.

Figure 12:
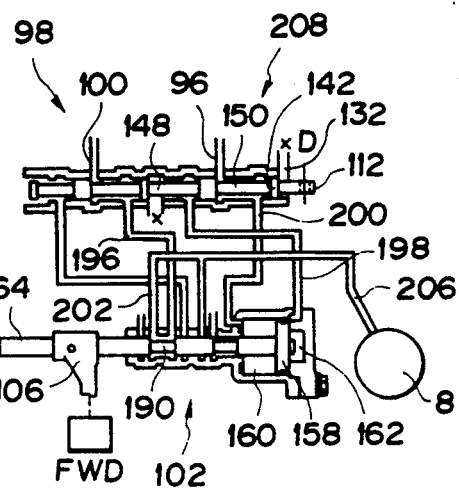

When the shift mechanism 104 is operated to the forwarding position D, the forward and reverse shifting mechanism 10 is held in the forward engagement state FWD because, as shown in FIG. 12, line pressure is supplied to the first chamber 160 of the shift servo valve 102 and line pressure is exhausted from the second chamber 162 as in FIG. 7. Furthermore, since the passage 100, which is communicated with the clutch control valve 86, is allowed to communicate with the passage 206 through the passages 196 and 202 (see 190 in FIG. 12), clutch pressure is supplied to the hydraulic clutch 8 so that the hydraulic clutch 8 is engaged.

When the shift mechanism 104 is operated to the neutral position N, the manual shift valve 98, as shown in FIG. 11, allows the fourth small diameter portion 150 and second opening portion 132 to communicate the first chamber 160 of the shift servo valve 102 with the oil pan through the passage 200, blocks off the passage 96 by means of the fourth large diameter portion 140, and allows the third small diameter portion 148 to communicate the second chamber 162 with the oil pan through the passage 198.

By this, in the shift servo valve 102, since line pressure is exhausted from the first chamber 160 and line pressure is exhausted from the second chamber 162, the piston 158 is prohibited from moving, and as a result, the shift servo rod 164 is held in the position which results when the shift servo rod 164 is moved in the direction (i.e. the rod 164 is held in the same position as FIG. 12), and the forward and reverse shifting mechanism 10 is held in the forward engagement state FWD. At this time, since the manual shift valve 98 blocks off the passage 100 (see 136 in FIG. 11) and allows the passage 196, which is communicated with the passage 206 by means of the shift servo valve 102 (see 190 in FIG. 11) through the passage 202, to communicate with the oil pan, clutch pressure is exhausted form the hydraulic clutch 8 so that the hydraulic clutch 8 is disengaged.

Figure 10:
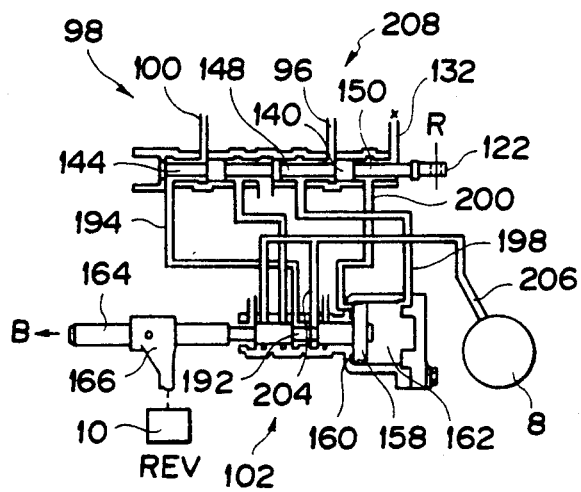

Referring to FIG. 10, when the shift mechanism 104 is operated from the neutral N position to the reverse R position, the second chamber 162 communicates with passage 96 via the path 198→48→96. The first chamber 160 communicates with the oil pan via the path 200→150→132. Thus, the piston 158 is moved from its FIG. 11 position in the direction B until it reaches its FIG. 10 position, thereby causing the engagement state of the forward and reverse shifting mechanism 10 to change from FWD to REV. In addition, the hydraulic clutch 8 communicates with passage 100 via the path 206→204→192→194→144→100, whereby clutch pressure is applied to the clutch 8 in order to engage the clutch.

Figure 9:
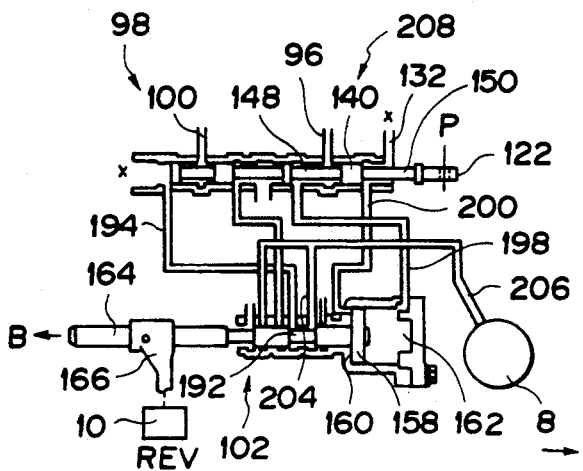
FIGS. 9 through 13 are explanatory views generally similar to FIGS. 4–8,, and illustrate the motions of the manual shift valve and shift servo valve in assuming various operating positions when the shift mechanism is operated from the forwarding (D) position to the reversing (R) position via the neutral (N) position.

When the shift mechanism 104 is operated to the park position P, the manual shift valve 98, as shown in FIG. 9, allows the fourth small diameter portion 150 and second opening portion 132 to communicate the first chamber 160 of the shift servo valve 102 with the oil pan through the passage 200, and allows the third small diameter portion 148 to communicate the second chamber 162 with the passage 96 through the passage 198.

By this, in the shift servo valve 102, since line pressure is exhausted from the first chamber 160 and line pressure is supplied into the second chamber 162, the shift servo rod 164 is held in the position which results when the shift servo rod 164 is moved by the piston 158 in the direction B (i.e. the rod is held in the same position as FIG. 10), and as a result, the forward and reverse shifting mechanism 10 is held in the reverse engagement state REV. At this time, since the manual shift valve 98 blocks off the passage 100 and allows the passage 194, which is communicated with the passage 206 through the passage 204 (see 192 in FIG. 9), to be communicated with the oil pan at 130, clutch pressure is exhausted from the hydraulic clutch 8 so that the hydraulic clutch 8 is disengaged.

In this way, when the shift mechanism 104 is operated from the low-speed running position L to the forwarding position D, neutral position N, reversing position R, and parking position P in this order, the forward and reverse shifting mechanism 10 is brought into the following forward engagement state FWD or reverse engagement state REV in the various operating positions of the shift mechanism 104.

| Operating Position | Engagement Position |
|---|---|
| L | FWD |
| D | FWD |
| N | FWD |
| R | REV |
| P | REV |

That is, the forward and reverse shifting mechanism 10 is shifted from the forward engagement state FWD to the reverse engagement state REV when the shift mechanism 104 is operated from the neutral position N to the reversing position R.

In this way, in a shift control device of a transmission of the present invention, an oil pressure supply and exhaust mechanism 208 comprising various parts of the manual shift valve 98 is operated to shift the shift servo valve 102 by supplying and exhausting oil pressure to and from the shift servo valve 102, so that when the shift mechanism 104 is operated from a reversing position R to a forwarding position D via a neutral position N, or when the shift mechanism 104 is operated from a forwarding position D to a reversing position R via a neutral position N, the forward and reverse shifting mechanism 10 is held in a reverse engagement state REV in a reversing position R or in a forward engagement state FWD in a forwarding position D which is one position before the shift mechanism 104 is shifted to the neutral position N, and when the shift mechanism 104 is operated from the neutral position N to the forwarding position D or to the reversing position R, the forward and reverse shifting mechanism 10 is shifted to the forward engagement state FWD or to the reverse engagement state REV, respectively.

By this, pressure oil of the shift servo valve 102 is once exhausted in the neutral position N and pressure oil is newly supplied to the shift servo valve 102 when the shift mechanism 104 is operated again to the forwarding position D or reversing position R after the shift mechanism 104 is once operated to the neutral position N, and when the shifting operation of the forward and reverse shifting mechanism 10 does not go well due to meshing of the forwarding gear train 14 and reversing gear train 18, a reliable shifting operation can be obtained.

Similarly, when the shift mechanism 104 is operated from the neutral position N to the forwarding position D or to the reversing position R, the forward and reverse shifting mechanism 10 is shifted to the forward engagement state FWD or to the reverse engagement state REV, respectively. As a consequence, shifting operation of the forward and reverse shifting mechanism 10 can be performed in a state where the hydraulic clutch 8 disengaged in the neutral position N is engaged by means of operation of the shift mechanism 104 to the forwarding position D or to the reversing operation R, in other words, in a state where the hydraulic clutch 8 is not fully engaged.

By virtue of the foregoing arrangement, when shifting operation of the forward and reverse shifting operation 10 does not go well, the unfavorable condition of shifting operation can be overcome by returning the shift mechanism 104 once again to the neutral position N. As a consequence, operation for overcoming the unfavorable condition of shifting operation of the forward and reverse shifting mechanism 10 can be performed with ease. Furthermore, since shifting operation of the forward and reverse shifting mechanism 10 can be performed in a state where the hydraulic clutch 8 is not fully engaged, generation of a sound of shifting operation of the forward and reverse shifting mechanism 10 can be reduced, especially when the temperature is low.

Moreover, since the oil pressure supply and exhaust mechanism 208 can be provided with the manual shift valve 98 without requirement of any special treatment or machining, the present invention can be advantageously put into practice in view of cost. Furthermore, by providing, as shown in FIG. 3, first and second throttles 210 and 212 in the passages 200 and 198 communicating with the first and second chambers 160 and 162 of the shift servo valve 102 respectively, generation of a sound of shifting operation can be more reduced.

As described in the foregoing, according to the present invention, when shifting operation of the forward and reverse shifting mechanism goes wrong, the forward and reverse shifting mechanism can be shifted again to the forwarding state or reversing state after being once returned to the reverse engagement state or to the forward engagement state by the oil pressure supply and exhaust mechanism by operating the shift mechanism again to the forwarding position or to the reversing position after the shift mechanism is once operated to the neutral position. Accordingly, operation for overcoming the unfavorable condition of shifting operation can be performed.

Furthermore, since the forward and reverse shifting mechanism is shifted to the forward engagement state or to the reverse engagement state by the oil pressure supply and exhaust mechanism when the shift mechanism is operated from the neutral position to the forwarding position or to the reversing position, the forward and reverse shifting mechanism can be shifted in a state where the hydraulic clutch, which is disengaged in the neutral position, is engaged by means of operation of the shift mechanism to the forwarding position or to the reversing position, in other words, in a state where the hydraulic clutch is not fully engaged.

As a consequence, operation for overcoming the unfavorable condition of shifting operation can be performed with ease because the unfavorable condition of shifting operation can be overcome by returning the shift mechanism once to the neutral position. Furthermore, generation of a sound of shifting operation of the forward and reverse shifting mechanism can be reduced, especially when the temperature is low, because the forward and reverse shifting mechanism can be shifted in a state where the hydraulic clutch is not fully engaged.

FIGS. 21 through 33 show another embodiment of the present invention. In FIG. 23, the numeral 602 denotes a transmission of a vehicle such as, for example, non-stage transmission, and 604 a hydraulic control circuit of a shift control device. This non-stage transmission 602 is adapted to take off power of an internal combustion engine (not shown) after it is converted to a required ratio by continuously varying a gear ratio and includes a primary sheave 606, a secondary sheave 608, and a clutch, i.e., hydraulic clutch 610 which are operated by oil pressure of the hydraulic control circuit 604.

The hydraulic control circuit 604 is provided with an oil pump 612. This oil pump 612 is adapted to draw oil from an oil pan (not shown) and feeds the oil to a line pressure passage 614 so that the oil is supplied to the secondary sheave 608.

An oil strainer 616 adapted to filtrate oil is disposed between the oil pan and the oil pump 612.

The line pressure passage 614 is communicated with a first line pressure control valve 620 through an oil passage 618, also with a second line pressure control valve 624 through a passage 622, further with a ratio pressure control valve 628 through a passage 626, further with a clutch pressure control valve 632 through a passage 630, further with a solenoid regulator valve 636 through a passage 634, and with a relief valve 640 through a passage 638.

The first line pressure control valve 620 and the second line pressure control valve 624 are communicated with each other through a passage 642.

The first line pressure control valve 620 is communicated with a passage 646 which is provided with line solenoid 644.

Similarly, the ratio pressure control valve 628 is communicated with a passage 650 which is provided with a ratio solenoid 648.

The oil passage 646 and the oil passage 650 are connected together at a connected portion 652.

The ratio pressure control valve 628 is communicated with the primary sheave 606 through a ratio pressure passage 654. This ratio pressure passage 654 is connected at an intermediate part thereof with a passage 658 which is communicated with a cooling control valve 656.

The cooling control valve 656 is communicated with an oil cooler 662 through an oil passage 660, further with the clutch pressure control valve 632 through a passage 666, and communicates through a cooling oil passage 664 with the hydraulic clutch 610. The clutch pressure passage 664 is communicated at an intermediate part thereof with a manual shift valve 672 through oil passages 668 and 670.

The clutch control valve 632 is communicated with a clutch solenoid 676 through a passage 674.

The hydraulic clutch 610 is communicated with a shift servo valve 680 through a passage 678.

This shift servo valve 680 has a servo cylinder 682, a servo piston 684 which is movable within the servo cylinder 682, a shift servo rod 686 which is fixed to the servo piston 684, and a shift fork 688 fixedly mounted on the shift servo rod 686 and adapted to actuate a forward and reverse shifting mechanism 6116 (FIG. 25) which will be described below.

The shift servo valve 680 and manual shift valve 672 are communicated with each other by way of passages 690 and 692 through which clutch pressure acts.

The connected portion 652 between the oil passage 650 and the oil passage 646 is connected with an oil passage 694 which is communicated with the clutch solenoid 676.

This oil passage 694 is communicated with a passage 696 which is communicated with the ratio pressure control valve 628, and passages 698-1, 698-2 which are communicated with the solenoid regulator valve 636, passage 6100 which is communicated with the first line pressure control valve 620, and passages 6102-1, 6102-2 which are communicated with the clutch pressure control valve 632.

Likewise, the oil pump 612 and second line pressure control valve 624 are communicated with each other by way of a loop pressure passage 6104. This loop pressure passage 6104 is provided at an intermediate part thereof with a loop pressure regulator valve 6106. The loop pressure passage 6104 is connected with a passage 6108 adapted to feed oil in order to lubricate and cool various parts, with the clutch pressure control valve 632 through a passage 6110, and with the cooling control valve 656 through a passage 6112.

Similarly, the line solenoid 644, ratio solenoid 648 and clutch solenoid 676 are communicated with and controlled by a control unit of the non-stage transmission 602.

Figure 25:
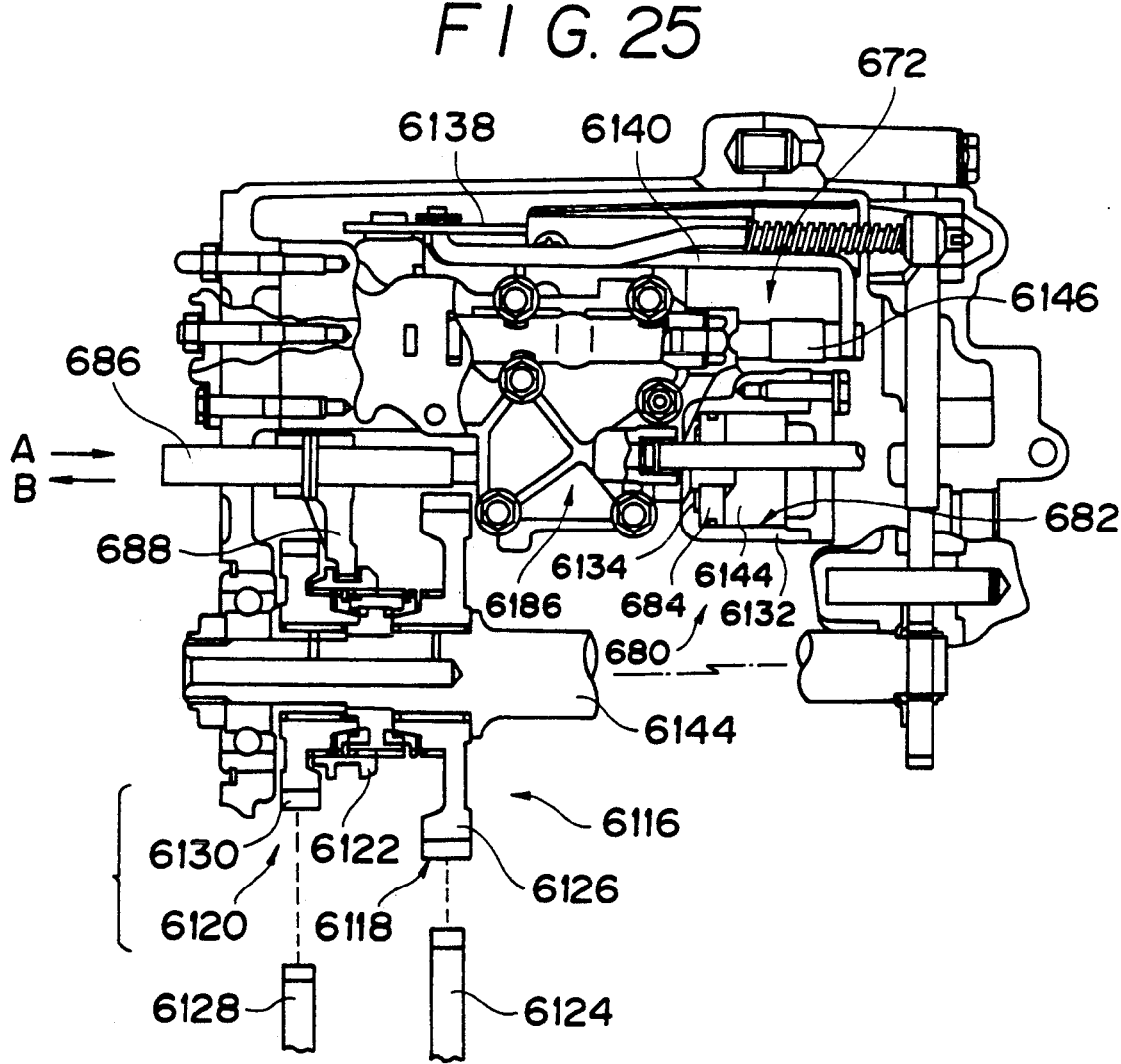
FIG. 25 is a front view of the shift control structure of the invention.

Furthermore, a final output shaft (not shown) of the hydraulic clutch 610 is operatively coupled with a drive wheel (not shown) through an intermediate shaft 6114 as shown in FIG. 25. Between the final clutch output shaft and the intermediate shaft 6114, a forward and reverse shifting mechanism 6116 adapted to shift a forward and reverse engagement state is disposed. This forward and reverse shifting mechanism 6116 has a forward gear train 6118, a reverse gear train 6120 and a switch sleeve 6122 as a switch member. The forward gear train 6118 comprises a forward output gear 6124 which is fixedly mounted on the final clutch output shaft, and a forward shift gear 6126 rotatably coaxially supported on the intermediate shaft 6114 and adapted to mesh with the forward output gear 6124.

Similarly, the reverse gear train 6120 comprises a reverse output gear 6128 which is fixedly mounted on the final clutch output shaft, a reverse shift gear 6130 rotatably coaxially supported on the intermediate shaft 6114, and an idler gear (not shown) which is adapted to mesh the reverse output gear 6128 with the reverse shift gear 6130.

The switch sleeve 6122 is nonrotatably mounted on the intermediate shaft 6114 and supported thereon for movement in the axial direction, and is adapted to fix either the forward shift gear 6126 or reverse shift gear 6130 nonrotatably to the intermediate shaft 114, thereby shifting the forward and reverse engagement state.

Various signals such as an opening degree of a carburetor throttle, a carburetor idle position, an accelerator pedal signal, a brake signal, a power mode option signal, a shift lever position, etc. are input into the control unit together with signals representing clutch pressure, driving side rotational speed, and driven side rotational speed.

The control unit is adapted to control the belt and the engagement state of the clutch in response to the various input signals discussed above. Such transmission control is conventional, and is disclosed, for example, in U.S. Pat. Nos. 4,926,716, 4,958,538, 4,856,380, 4,964,317, and 4,962,678, which are incorporated herein by reference. The control unit may be implemented using a conventional microprocessor circuit.

In the shift servo valve 680 adapted to supply and exhaust oil pressure in order to shift the forward and reverse shifting mechanism 6116, the servo piston 684, as shown in FIGS. 23 and 25 through 29, is slidably disposed within the servo cylinder 682 of a valve body 6132, the shift servo piston 684 is connected with one end of the shift servo rod 686, and the shift fork 688 is fixedly mounted on the shift servo rod 686 and adapted to engage with the switch sleeve 6122 of the forward and reverse shifting mechanism 6116.

Figure 27:
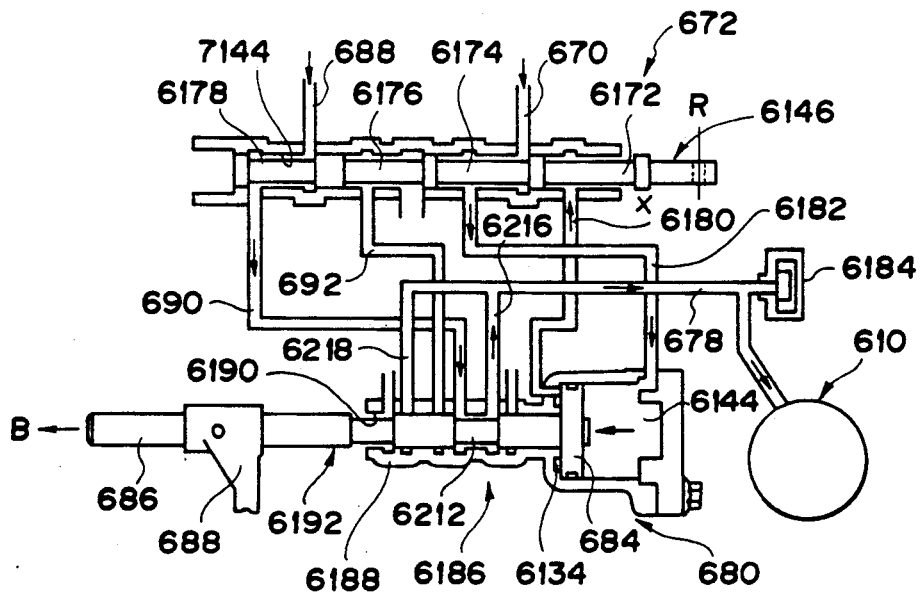
FIG. 27 is a schematic view showing the operation of the shift servo valve of FIG. 22 when in R range.
Figure 28:
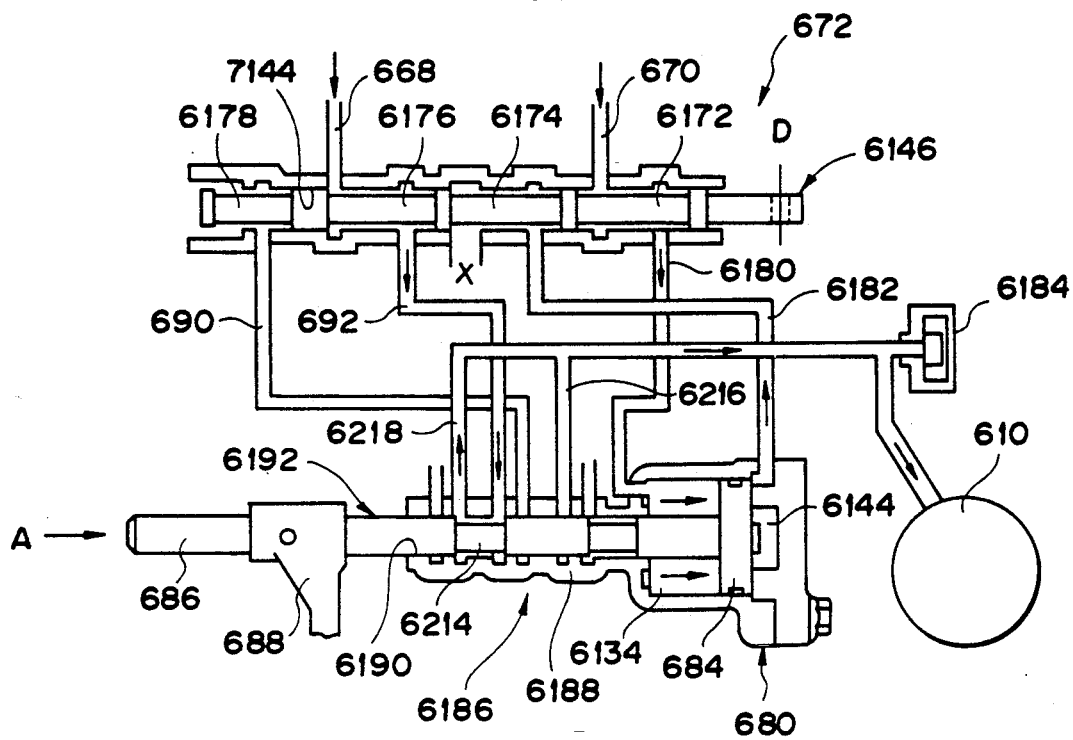
FIG. 28 is a schematic view showing the operation of the shift servo valve of FIG. 22 when in D range.

In the shift servo valve 680, when pressure oil is supplied into a first chamber 6134 defined within the servo cylinder 682 by the servo piston 684 and oil pressure is exhausted from the second chamber 6144, the servo piston 684 moves the shift servo rod 686 in the direction A in FIGS. 25 and 28 and as a result, the switch sleeve 6122 is moved toward the forward shift gear 6126 by the shift fork 688 (FIG. 25) in order to nonrotatably fix the forward shift gear 6126 to the intermediate shaft 6114, thereby shifting into a forward engagement state. On the other hand, in the shift servo valve 680, when pressure oil is supplied into the second chamber 6144 defined within the servo cylinder 682 by the servo piston 684 and oil pressure is exhausted from the first chamber 6134, the servo piston 684 moves the shift servo rod 686 in the direction B in FIGS. 25 and 27 and as a result, the switch sleeve 6122 is moved toward the reverse shift gear 6130 by the shift fork 688 in order to nonrotatably fix the reverse shift gear 6130 to the intermediate shaft 114, thereby shifting into a reverse engagement state.

In order to supply and exhaust pressure oil to and from the hydraulic clutch 610 and in order to supply and exhaust pressure oil to and from the shift servo valve 680, there is employed the manual shift valve 672 which is shifted by the operating rod 6140 of the shift mechanism 6138 of the non-stage transmission 602.

The manual shift valve 672, as shown in FIGS. 26 through 29, has a spool valve body 6146 slidably disposed within a slide hole 7144 of the valve body 6142. The valve body 6142 is provided with first through seventh annular groove portions 6148 through 6160 formed in an inner peripheral surface of the slide hole 7144. The spool valve 6146 is connected at one end thereof with the operating rod 6140 of the shift mechanism 6138 (FIG. 25). The spool valve 6146 is provided with first through fifth large diameter portions 6162 through 6170 which slidably contact the inner peripheral surface of the slide hole 7144, and also with first through fourth small diameter portions 6172 through 6178 which are respectively disposed between adjacent pairs of the first through fifth large diameter portions 6162 through 6170.

The first groove portion 6148 formed on the valve body 6142 of the manual shift valve 672 is communicated with a passage 6180. This first passage 6180 is communicated with the first chamber 6134 of the shift servo valve 680. The second groove portion 6150 formed on the valve body 6142 of the manual shift valve 672 is communicated with the passage 670, and clutch pressure as pressure oil to act on the hydraulic clutch 610 is supplied thereto. The third groove portion 6152 formed on the valve body 6142 of the manual shift valve 672 is communicated with a passage 6182. This passage 6182 is communicated with the second chamber 6144 of the shift servo valve 680. The fourth groove portion 6154 formed on the valve body 6142 of the manual shift valve 672 is communicated with the oil pan (not shown).

Figure 26:
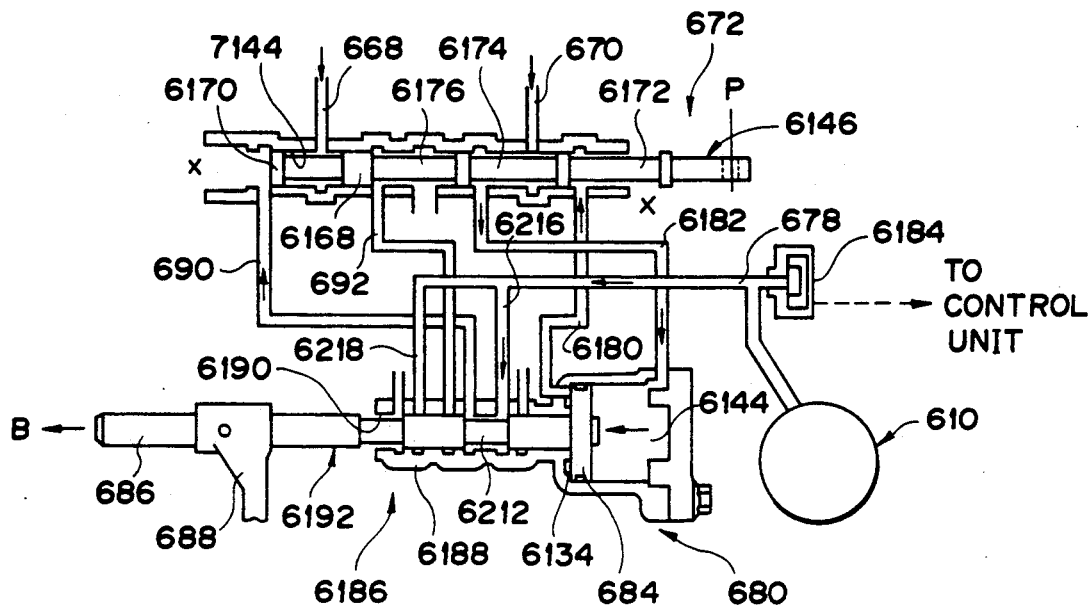
FIG. 26 is a schematic view showing the operation of the shift servo valve of FIG. 22 when in P range.

Similarly, the fifth groove portion 6156 formed on the valve body 6142 of the manual shift valve 672 is communicated with the oil passage 692. The sixth groove portion 6158 of the manual shift valve 672 is communicated with the oil passage 668, and clutch pressure as oil pressure to act on the hydraulic clutch 610 is supplied thereto. The seventh groove portion 6160 of the manual shift valve 672 is communicated with the oil passage 690. Clutch pressure as pressure oil is supplied to and exhausted from the hydraulic clutch 610 by way of the oil passages 690 and 692 through the oil passage 678. The oil passage 678 is provided at an intermediate part thereof with a pressure sensor 6184 adapted to detect clutch pressure in passage 678. The pressure sensor 6184 is connected to the control unit to provide clutch pressure information (FIG. 26).

In order to prevent engagement of the hydraulic clutch 610 when the shift servo valve 680 is not activated, there is employed a pressure oil supply stop mechanism 6186 adapted to stop the supply of clutch pressure as pressure oil to the hydraulic clutch 610.

The oil pressure supply stop mechanism 6186 is integral with the shift servo valve 680. That is, the pressure oil supply stop mechanism 6186 has a spool valve body 6192 which is slidably disposed within the slide hole 6190 of the valve body 6188 which is integral with the valve body 6132 of the shift servo valve 680. This spool valve body 6192 is integrally formed with the shift servo rod 686. The valve body 6188 is provided with first through sixth annular groove portions 6194 through 6204 which are formed in an inner peripheral surface of the slide hole 6190 thereof. The spool valve body 6192 is provided with first through third large diameter portions 6206, 6208 and 6210 which slidably contact the inner peripheral surface of the slide hole 6190, and with first and second small diameter portions 6212 and 6214 which are disposed between adjacent pairs of the first through third large diameter portions 6206 through 6210.

The first groove portion 6194 formed in the valve body 6188 of the oil pressure supply stop mechanism 6186 is communicated with the oil pan. The second groove portion 6196 of the oil pressure supply stop mechanism 6186 is communicated with the oil passage 678 by way of a passage 6216. The third groove portion 6198 of the oil pressure supply stop mechanism 6186 is communicated with the oil passage 690. The fourth groove portion 6200 of the oil pressure supply stop mechanism 6186 is communicated with the oil passage 692. The fifth groove portion 6202 of the oil pressure supply stop mechanism 6186 is communicated with the oil passage 678 by way of a passage 6218. The sixth groove portion 6204 of the oil pressure supply stop mechanism 6186 is communicated with the oil pan.

The hydraulic control circuit 604 of the non-stage transmission 602 has, for example, two pieces of first and second line pressure control valves 620 and 624.

In order to supply and exhaust pressure oil by shifting the forward and reverse shifting mechanism 6116 of the non-stage transmission 602, there is employed the shift servo valve 680 adapted to make the clutch pressure into servo pressure, and there is also employed a confirmation switch 6220 which is mounted adjacent and operatively connected to an end portion of the shift servo rod 686 of the shift servo valve 680 and which is connected to the control unit and adapted to confirm the position of the shift servo valve 680. When an unfavorable engagement state between either the forward gear train 6118 or reverse gear train 6120 and the switch sleeve 6122 of the forward and reverse shifting mechanism 6116 is confirmed by the confirmation switch 6220, at least the servo cylinder pressure of the shift servo valve 680 is lowered and then the servo cylinder pressure is raised again in order to overcome the unfavorable engagement state.

Figure 22:
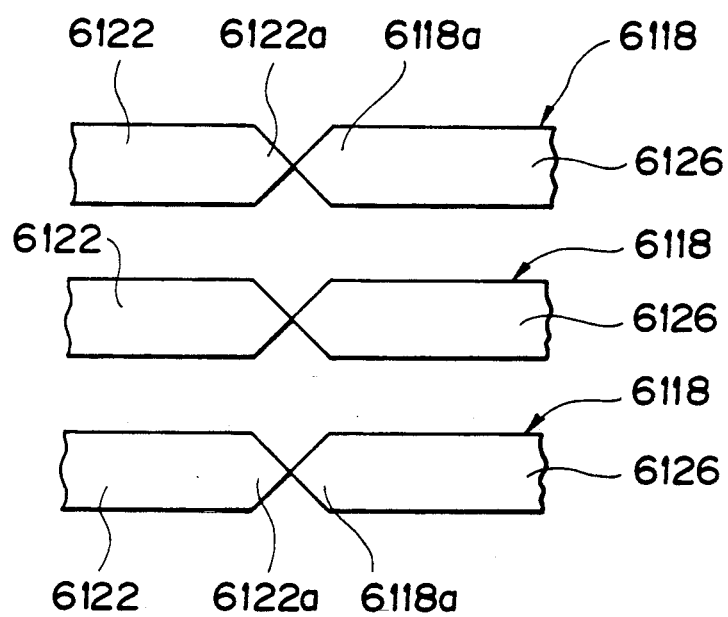
FIG. 22 is an enlarged view showing a wrong meshing state between a shift sleeve and a gear.
Figure 23:
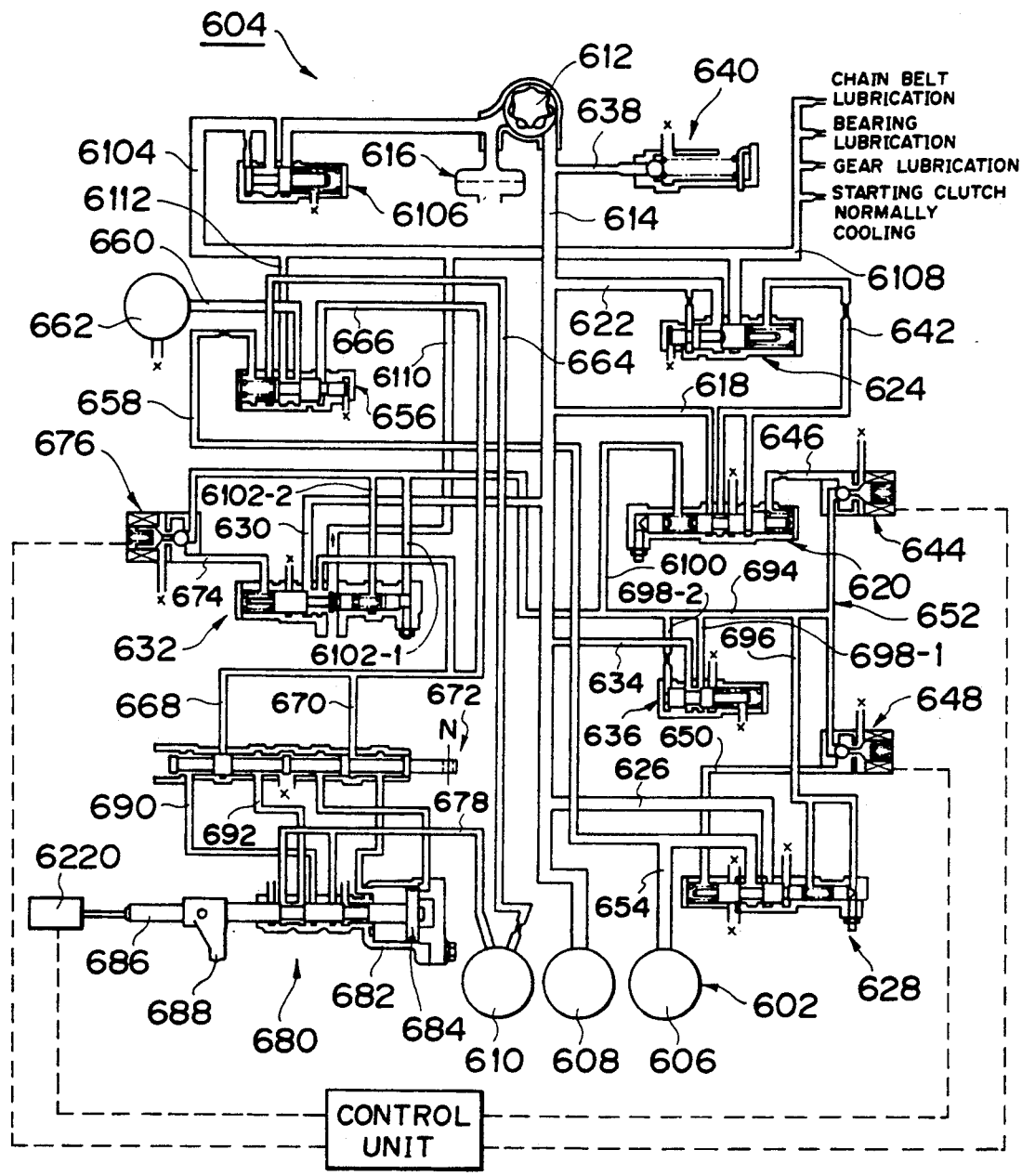
FIG. 23 is a schematic diagram of a hydraulic control circuit of a transmission according to the invention.
Figure 24:
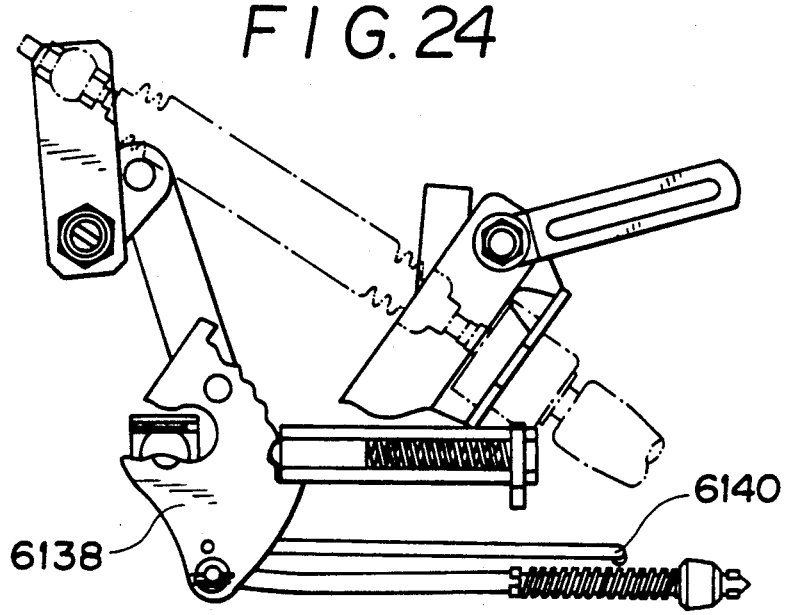
FIG. 24 is a plan view of a shift mechanism used in the invention.

More specifically, as is shown in FIG. 22, in the case of an unfavorable engagement in which respective end portions of a foremost meshing portion 6118a of either the forward gear train 6118 or reverse gear train 6120, for instance, forward shift gear 6126 and a foremost meshing portion 6122a of the switch sleeve 6122 are abutted against each other and stopped in a generally linear state, in other words, in the event the shift servo rod 686 of the shift servo valve 680 is not in a correct position when the position is confirmed by the confirmation switch 6220 (comprising, for example, a conventional potentiometer switch), the clutch pressure is lowered so that the servo cylinder pressure of the shift servo valve 680 is lowered, and then the clutch pressure is raised again so that the servo cylinder pressure is raised, thereby overcoming the unfavorable engagement between either the forward gear train 6118 or reverse gear train 6120 and the switch sleeve 6122 of the forward and reverse shifting mechanism 6116.

The correct positions of the shift servo rod 86 are shown in FIGS. 30 through 33. The correct position of shift servo rod 686 is position A in N, D and L ranges (see FIGS. 32-33), and position B in P and R ranges (see FIGS. 30-31).

Next, operation will be described.

Driving force of the internal combustion engine mounted on a vehicle is converted to a desired torque-/engine speed by the non-stage transmission 602 and then taken off in order to drive the drive wheel.

In such non-stage transmission 602, when the non-stage transmission 602 is shifted to the parking range P by the shift mechanism 6138, the manual shift valve 672, as shown in FIG. 26, permits the first small diameter portion 6172 of the spool valve body 6146 to communicate the passage 6180 With the oil pan, permits the second small diameter portion 6174 to communicate the passage 6182 with the oil passage 670, permits the fourth and fifth large diameter portions 6168 and 6170 to block off the oil passage 668, permits the third small diameter portion 6176 to communicate the oil passage 692 with the oil pan, and permits an external edge of the fifth large diameter portion 6170 to communicate the oil passage 690 with the oil pan.

By this, in the shift servo valve 680, clutch pressure is exhausted from the first chamber 6134 and clutch pressure is supplied into the second chamber 6144, and as a result, the servo piston 684 moves the shift servo rod 686 in the direction B so that the switch sleeve 6122 is moved toward the reverse shift gear 6130 by the shift fork 688 to nonrotatably fix the reverse shift gear 6130 to the intermediate shaft 6114, thereby shifting into a reverse engagement state.

At this time, in the oil pressure supply stop mechanism 6186, although the oil passage 690 and the passage 6216 are communicated with each other by the first small diameter portion 6212 of the spool valve body 6192, the manual shift valve 672 blocks off the oil passage 668 (see 6168 and 6170 in FIG. 6) and communicates the oil passages 692 and 690 with the oil pan (see 6176).

As a consequence, since clutch pressure is not supplied to the hydraulic clutch 610, the hydraulic clutch 610 is not engaged, and as a result, driving force is not output by the non-stage transmission 602, thereby making it impossible for the vehicle to move.

When the non-stage transmission 602 is shifted to the reverse range R by the shift mechanism 6138, the manual shift valve 672, as shown in FIG. 27, permits the first small diameter portion 6172 of the spool valve body 6146 to communicate the passage 6180 with the oil pan, permits the second small diameter portion 6174 to communicate the passage 6182 with the oil passage 670, permits the third small diameter portion 6176 to communicate the oil passage 692 with the oil pan, and permits the fourth small diameter portion 6178 to communicate the oil passage 690 with the oil passage 668.

By this, in the shift servo valve 680, clutch pressure is exhausted from the first chamber 6134 and clutch pressure is supplied into the second chamber 6144, and as a result, the servo piston 684 moves the shift servo rod 686 in the direction B so that the switch sleeve 6122 is moved toward the reverse shift gear 6130 by the shift fork 688 to nonrotatably fix the reverse shift gear 6130 to the intermediate shaft 6114, thereby shifting into a reverse engagement state.

At this time, in the oil pressure supply stop mechanism 6186, the oil passage 690 and the passage 6216 are communicated with each other by way of the first small diameter portion 6212 of the spool valve body 6192.

As a consequence, clutch pressure as oil pressure from the oil passage 668 is supplied to the hydraulic clutch 610 through oil passage 690, passage 6216 and oil passage 78, and the hydraulic clutch 610 is engaged. As a result, driving force is output by the non-stage transmission 602, thereby making it possible for the vehicle to move in reverse.

When the non-stage transmission 602 is shifted to the drive range D by the shift mechanism 6138, the manual shift valve 672, as shown in FIG. 28, permits the first small diameter portion 6172 of the spool valve body 6146 to communicate the passage 6180 with the oil passage 670, permits the second small diameter portion 6174 to communicate the passage 6182 with the oil pan, permits the third small diameter portion 6176 to communicate the oil passage 692 with the oil passage 668, and permits the fourth small diameter portion 6178 to communicate the oil passage 690 with the oil pan.

By this, in the shift servo valve 680, clutch pressure is supplied into the first chamber 6134 and clutch pressure is exhausted from the second chamber 6144, and as a result, the servo piston 684 moves the shift servo rod 686 in the direction A so that the switch sleeve 6122 is moved toward the forward shift gear 6126 by the shift fork 688 to nonrotatably fix the forward shift gear 6126 to the intermediate shaft 6114, thereby shifting into a forward engagement state.

At this time, in the oil pressure supply stop mechanism 6186, the oil passage 692 and the passage 6218 are communicated with each other by way of the small diameter portion 6214 of the spool valve body 6192.

As a consequence, clutch pressure as oil pressure from the oil passage 668 is supplied to the hydraulic clutch 610 through oil passage 692, passage 6218 and oil passage 678, and the hydraulic clutch 610 is engaged. As a result, driving force is output by the non-stage transmission 602, thereby making it possible for the vehicle to move forward.

Figure 29:
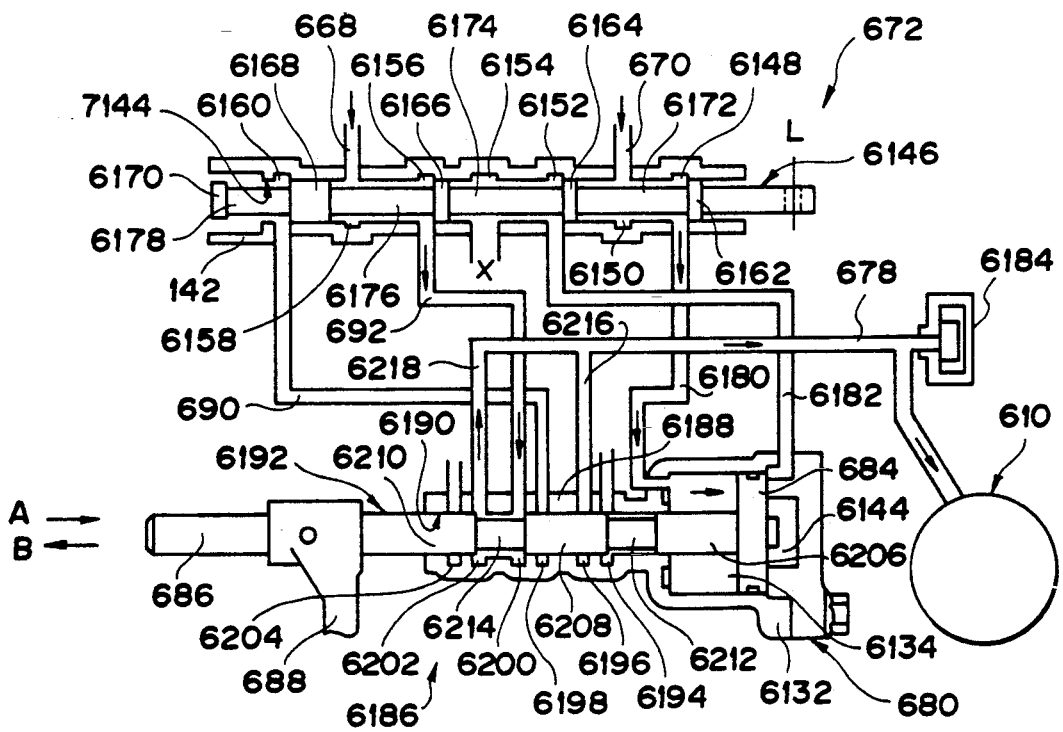
FIG. 29 is a schematic view showing the operation of the shift servo valve of FIG. 22 when in L range.
Figure 30:
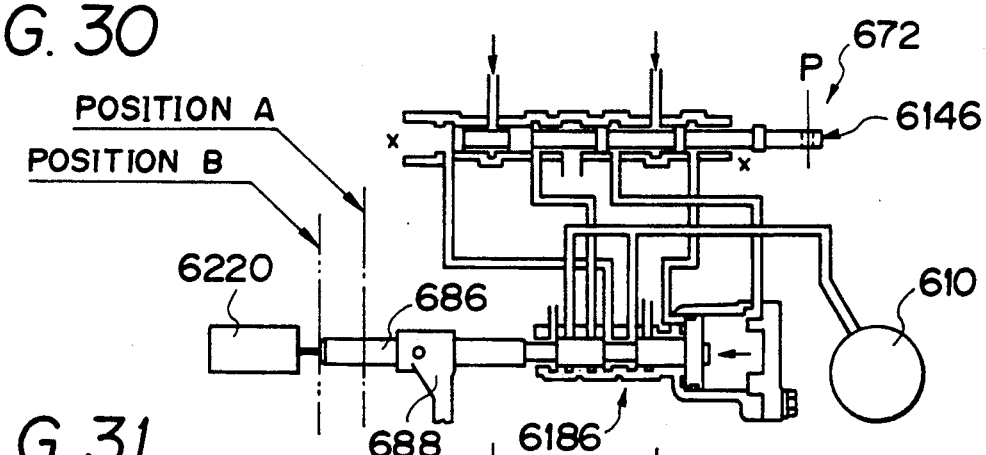
FIG. 30 is a schematic view showing the position of the shift servo valve when in P range.
Figure 31:
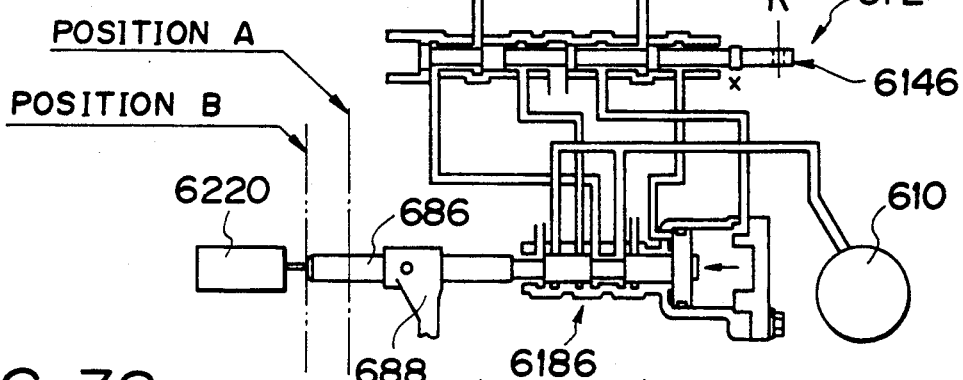
FIG. 31 is a schematic view showing the position of the shift servo valve when in R range.
Figure 32:
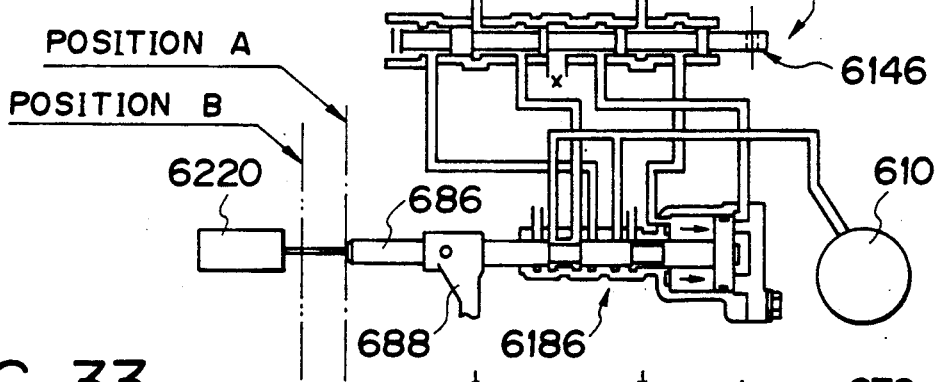
FIG. 32 is a schematic view showing the position of the shift servo valve when in D range.
Figure 33:
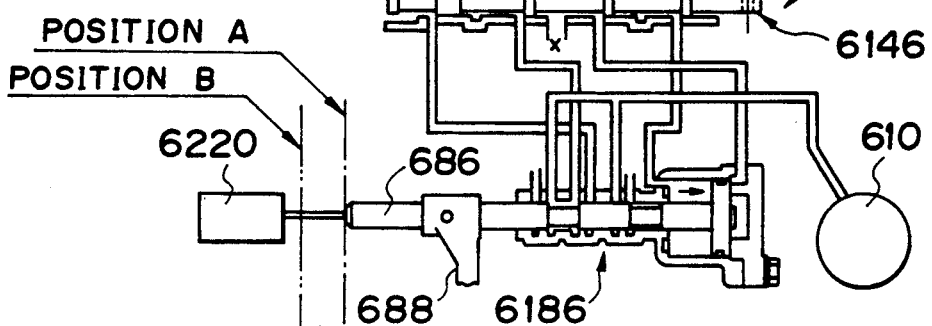
FIG. 33 is a schematic view showing the position of the shift servo valve when in L range.
Figure 34:
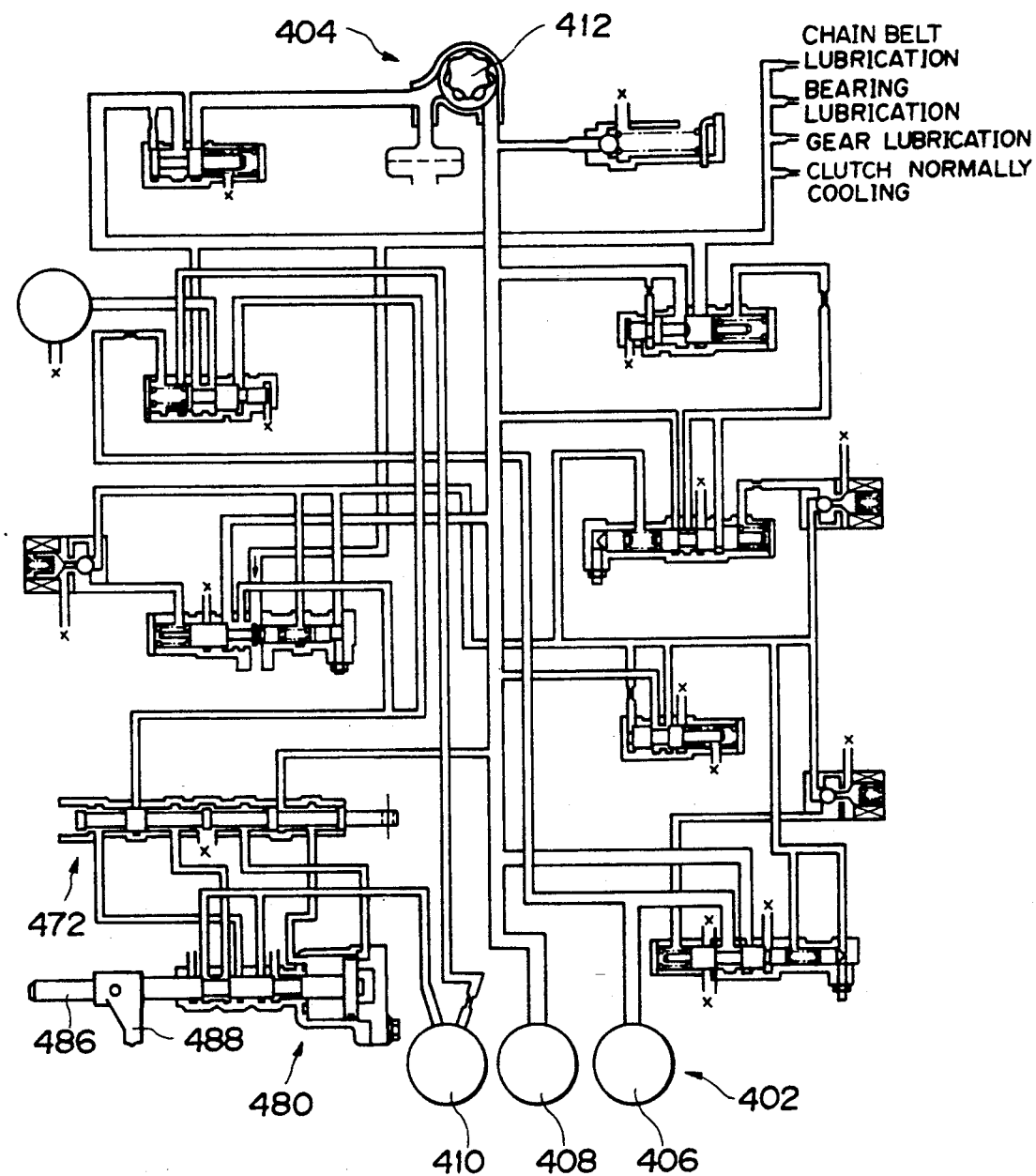
FIG. 34 is a schematic view of a conventional hydraulic control circuit of a transmission.

When the non-stage transmission 602 is shifted to the low range L by the shift mechanism 6138, the manual shift valve 672, as shown in FIG. 29, permits the first small diameter portion 6172 of the spool valve body 6146 to communicate the passage 6180 with the oil passage 670, permits the second small diameter portion 6174 to communicate the passage 6182 with the oil pan, permits the third small diameter portion 6176 to communicate the oil passage 692 with the oil passage 668, and permits the fourth small diameter portion 6178 to communicate the oil passage 690 with the oil pan.

By this, in the shift servo valve 680, clutch pressure is supplied to the first chamber 6134 and clutch pressure is exhausted from the second chamber 6144, and as a result, the servo piston 684 moves the shift servo rod 686 in the direction A so that the switch sleeve 6122 is moved toward the forward shift gear 6126 by the shift fork 688 to nonrotatably fix the forward shift gear 6126 to the intermediate shaft 6114, thereby shifting into a forward engagement state.

At this time, in the oil pressure supply stop mechanism 6186, the oil passage 692 and the passage 6218 are communicated with each other by way of the second small diameter portion 6214 of the spool valve body 6192.

As a consequence, clutch pressure as oil pressure from the oil passage 668 is supplied to the hydraulic clutch 610 through oil passage 692, passage 6218 and oil passage 678, and the hydraulic clutch 610 is engaged. As a result, driving force is output by the non-stage transmission 602, thereby making it possible for the vehicle to move forward.

In the case of an unfavorable engagement in which respective end portions of a foremost meshing portion 6118a of, for instance, the forward gear train 6118 and a foremost meshing portion 6122a of the switch sleeve 6122 are abutted against each other and stopped in a generally linear state, as shown in FIG. 22, when the non-stage transmission 602 is shifted by the shift mechanism 6138, the clutch pressure is lowered so that the servo cylinder pressure of the shift servo valve 680 is lowered. Then, the clutch pressure is raised again so that the servo cylinder pressure is raised, thereby overcoming the unfavorable engagement of the forward and reverse shifting mechanism 6116.

When the meshing portions of sleeve 6122 and gear 6126 abut each other as shown in FIG. 22, the servo rod 686 does not reach the correct position, and this is detected by the switch 6220.

Figure 21:
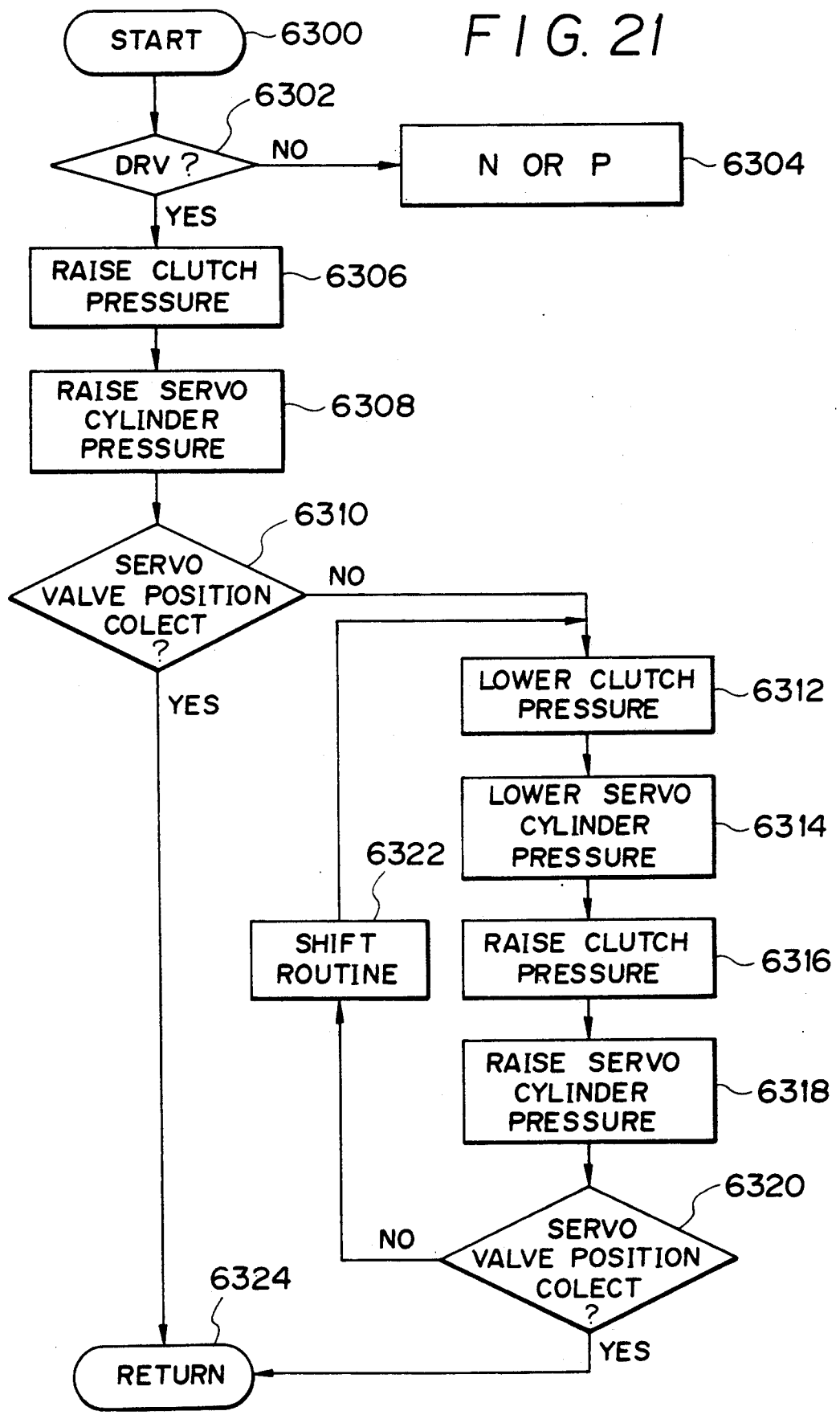
FIG. 21 is a shift control flowchart which illustrates a shift control procedure performed by the present invention.

The above will be described in more detail with reference to the shift control flowchart of FIG. 21. Upon actuation of the internal combustion engine of a vehicle, execution of a program according to the shift control flowchart of FIG. 1 is started (6300) by the control unit.

First, it is judged at 6302 whether or not the current shifting operation has selected, for example, the drive range D. If this judgment (6302) is NO, then control goes to other shift control flowcharts for ranges such a R, N, P and other than the D range (6304). If the judgment (6302) is YES, then clutch pressure is raised (6306), and the servo cylinder pressure is also raised (6308).

When the shifting operation is made to this D drive range, the position of the shift servo rod 686 of the shift servo valve 680 is confirmed by the confirmation switch 6220, and it is judged at 6310 by the confirmation switch 220 whether or not the position of the shift servo rod 686 is correct.

If this judgment (6310) is YES, then control goes to RETURN (6324). If this judgment (6310) is NO, that is, if the position of the shift servo rod 686 is not correct, the clutch pressure is lowered (6312) so that the servo cylinder pressure of the shift servo valve 680 is lowered (6314). Thereafter, the clutch pressure is raised again (6316) so that the servo cylinder pressure of the shift servo valve 680 is raised (6318) in order to ensure the engagement state between the forward gear train 6118 and the switch sleeve 6122, thereby overcoming the unfavorable engagement state between the forward gear train 6118 and the switch sleeve 6122.

The position of the shift servo rod 686 of the shift servo valve 680 is then checked again using the confirmation switch 6220, and it is judged at 6320 by the confirmation switch 6220 whether or not the position of the shift servo rod 686 is correct.

If this judgment (6320) is NO, then control goes back to the lowering operation (6312) of the clutch pressure via the shift routine (6322), and if the judgment (6320) is YES, then control goes to RETURN (6324).

By this, when the position of the shift servo rod 686 is not correct, the clutch pressure is lowered so that the servo cylinder pressure of the shift servo valve 680 is lowered, and the relative rotational position of the forward gear 6126 and switch sleeve 6122 is changed slightly. Then the clutch pressure is raised again so that the servo cylinder pressure is raised in order to ensure the engagement state between the forward gear 6126 and the switch sleeve 6122 and to overcome the unfavorable engagement state. As a result, there can be avoid such inconveniences as inability to start the vehicle when the shift operation occurs, generation of a ratchet sound (for instance, scratching sound) at the chamfer parts, and damage to the forward gear 6126, reverse gear 6130 or the switch sleeve 6122, which is advantageous in view of practical use.

Furthermore, change is required only in the hydraulic control circuit 604, and no special machining or treatment is required for the forward gear train 6118, reverse gear train 6120 and switch sleeve 6122 in view of manufacture. Accordingly, the construction can be simplified, manufacture is easy and cost can be reduced, which is advantageous from an economic viewpoint.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a shift control device of a transmission comprising a manual shift valve shifted by a shift mechanism of a transmission having a hydraulic clutch operated to be connected and disconnected by oil pressure and a forward and reverse shifting mechanism shiftable to forward and reverse engagement states and adapted to supply and exhaust oil pressure, and a shift servo valve shifted by oil pressure supplied and exhausted by said manual shift valve, the improvement wherein said shift control device of a transmission further comprises an oil pressure supply and exhaust mechanism operated to shift said shift servo valve by supplying and exhausting oil pressure to and from said shift servo valve, so that when said shift mechanism is operated from a reversing position to a forwarding position via a neutral position, said shift servo valve is operated to hold said forward and reverse shifting mechanism in said reverse engagement state until said shift mechanism is operated to the neutral position and to shift said forward and reverse shifting mechanism to said forward engagement state when said shift mechanism is operated to the forwarding position, and when said shift mechanism is operated from the forwarding position to the reversing position via the neutral position, said shift servo valve is operated to hold said forward and reverse shifting mechanism in said forward engagement state until said shift mechanism is operated to the neutral position and to shift said forward and reverse shifting mechanism to said reverse engagement state when said shift mechanism is operated to the reversing position.

2. A transmission for transferring driving power from an engine to an output shaft, comprising:
   a forward gear train and a reverse gear train which are each adapted for driving engagement between the engine and the output shaft;
   clutch means for bringing said gear trains into and out of driving engagement with the engine;
   shifting means for selectively drivingly coupling one of said gear trains to the output shaft;
   said clutch means, said shifting means and said gear trains being cooperable to define a plurality of individually selectable transmission operating states, including a reverse driving state in which said reverse gear train is drivingly engaged between the engine and the output shaft, a neutral state in which both of said gear trains are disengaged from the engine, and a forward driving state in which said forward gear train is drivingly engaged between the engine and the output shaft; and
   shift control means responsive to a change in transmission operating state from said reverse driving state to said neutral state for maintaining said reverse gear train coupled to the output shaft even after the transmission operating state has changed to said neutral state.

3. A transmission according to claim 2, wherein said shift control means includes means responsive to a change in transmission state from said reverse driving state through said neutral state and thereafter into said forward driving state for uncoupling said reverse gear train from the output shaft and coupling said forward gear train to the output shaft only after said forward driving state has been selected.

* * * * *